US012244063B2

(12) United States Patent
Miki et al.

(10) Patent No.: US 12,244,063 B2
(45) Date of Patent: Mar. 4, 2025

(54) ARRAY ANTENNA

(71) Applicants: Sumitomo Electric Industries, Ltd., Osaka (JP); AutoNetworks Technologies, Ltd., Yokkaichi (JP); Sumitomo Wiring Systems, Ltd., Yokkaichi (JP)

(72) Inventors: Yutaro Miki, Osaka (JP); Suguru Yamagishi, Osaka (JP); Ichiro Kuwayama, Osaka (JP); Daisuke Miyawaki, Yokkaichi (JP); Kosuke Sone, Yokkaichi (JP)

(73) Assignees: Sumitomo Electric Industries, Ltd., Osaka (JP); AutoNetworks Technologies, Ltd., Yokkaichi (JP); Sumitomo Wiring Systems, Ltd., Yokkaichi (JP)

( * ) Notice: Subject to any disclaimer, the term of this patent is extended or adjusted under 35 U.S.C. 154(b) by 112 days.

(21) Appl. No.: 18/011,195

(22) PCT Filed: Jul. 29, 2021

(86) PCT No.: PCT/JP2021/028071
§ 371 (c)(1),
(2) Date: Dec. 19, 2022

(87) PCT Pub. No.: WO2022/030351
PCT Pub. Date: Feb. 10, 2022

(65) Prior Publication Data

US 2023/0231317 A1 Jul. 20, 2023

(30) Foreign Application Priority Data

Aug. 3, 2020 (JP) ................................ 2020-131525

(51) Int. Cl.
*H01Q 1/52* (2006.01)
*H01Q 15/14* (2006.01)
(Continued)

(52) U.S. Cl.
CPC ............... *H01Q 15/14* (2013.01); *H01Q 1/52* (2013.01); *H01Q 21/06* (2013.01); *H01Q 21/28* (2013.01)

(58) Field of Classification Search
CPC .......... H01Q 15/14; H01Q 1/52; H01Q 21/06; H01Q 21/28
See application file for complete search history.

(56) References Cited

U.S. PATENT DOCUMENTS 5,061,943 A * 10/1991 Rammos ............ H01Q 21/0075 343/789
5,220,334 A * 6/1993 Raguenet ................ H01Q 9/20 343/793
(Continued)

FOREIGN PATENT DOCUMENTS

JP H0730323 A * 1/1995
JP 2007-243375 A 9/2007
(Continued)

OTHER PUBLICATIONS

Adela et al., "High-Isolation Array Antenna Integration for Single-Chip Millimeter-Wave FMCW Radar", IEEE Transactions on Antennas and Propagation, vol. 66, No. 10, Oct. 2018, pp. 5214-5223.

*Primary Examiner* — Henry Luong
(74) *Attorney, Agent, or Firm* — XSENSUS LLP

(57) ABSTRACT

This array antenna is an array antenna to be used for beam forming and includes: a plurality of antenna elements; a ground; a dielectric provided between the plurality of antenna elements and the ground, the dielectric having an electrical length, from the plurality of antenna elements to the ground, of not less than 0.03; and a shield structure
(Continued)

provided at least between the plurality of antenna elements and configured to shield a radio wave radiated from each antenna element.

8 Claims, 26 Drawing Sheets

(51) Int. Cl.
*H01Q 21/06* (2006.01)
*H01Q 21/28* (2006.01)

(56) References Cited

U.S. PATENT DOCUMENTS

2007/0285336 A1* 12/2007 Kamgaing ............. H01Q 1/523 343/895
2014/0028524 A1* 1/2014 Jerauld .................... H01Q 1/52 343/893
2020/0028269 A1 1/2020 Kim et al.

FOREIGN PATENT DOCUMENTS

| | | | |
|---|---|---|---|
| JP | 2009-540691 | A | 11/2009 |
| JP | 2011-45036 | A | 3/2011 |
| JP | 2012-70237 | A | 4/2012 |
| JP | 2013-58585 | A | 3/2013 |
| JP | 2013-89992 | A | 5/2013 |
| JP | 2013-183082 | A | 9/2013 |
| JP | 2020-14190 | A | 1/2020 |

* cited by examiner

| No. | EBG ARRAY |
|---|---|
| 1-1 |  |
| 1-2 |  |
| 1-3 |  |
| 1-4 |  |
| 1-5 |  |

FIG. 14

HEXAGONAL CELL EBG @28GHz

| | No.1-1 | No.1-2 | No.1-3 | No.1-4 | No.1-5 |
|---|---|---|---|---|---|
| H-POLARIZED WAVE | -18.3dB | -21.9dB | -23.1dB | -28.0dB | -28.4dB |
| V-POLARIZED WAVE | -26.6dB | -19.1dB | -21.9dB | -22.3dB | -22.7dB |

| No. | EBG ARRAY |
| --- | --- |
| 2-1 |  |
| 2-2 |  |
| 2-3 |  |
| 2-4 |  |
| 2-5 |  |

FIG. 24

SQUARE CELL EBG @28GHz

| | No.2-1 | No.2-2 | No.2-3 | No.2-4 | No.2-5 |
|---|---|---|---|---|---|
| H-POLARIZED WAVE | -18.1dB | -16.9dB | -16.6dB | -18.6dB | -18.8dB |
| V-POLARIZED WAVE | -24.0dB | 17.5dB | -20.0dB | -20.2dB | -20.2dB |

ARRAY ANTENNA

CROSS-REFERENCE TO RELATED APPLICATIONS

The present application is based on PCT/JP2021/028071, filed on Jul. 29, 2021, which claims priority on Japanese Patent Application No. 2020-131525, filed on Aug. 3, 2020, the entire contents of each are incorporated herein by reference.

TECHNICAL FIELD

The present disclosure relates to an array antenna.

BACKGROUND ART

The 5th-generation mobile communication system (5G) enables high-speed, large-volume, and low-delay communication. In 5G, a 28 GHz band being a quasi-millimeter wave band is used.

CITATION LIST

Patent Literature

PATENT LITERATURE 1: Japanese Laid-Open Patent Publication No. 2013-58585
PATENT LITERATURE 2: Japanese Laid-Open Patent Publication No. 2013-183082
PATENT LITERATURE 3: Japanese Laid-Open Patent Publication. No. 2012-70237

SUMMARY OF THE INVENTION

An array antenna according to an aspect of the present disclosure includes: a plurality of antenna elements; a ground; a dielectric provided between the plurality of antenna elements and the ground, the dielectric having an electrical length, from the plurality of antenna elements to the ground, of not less than 0.03; and a shield structure provided at least between the plurality of antenna elements and configured to shield a radio wave radiated from each antenna element.

BRIEF DESCRIPTION OF DRAWINGS

FIG. 14 is a table showing the magnitude of coupling between adjacent elements.

FIG. 24 is a table showing the magnitude of coupling between adjacent elements.

DETAILED DESCRIPTION

Figure 1:
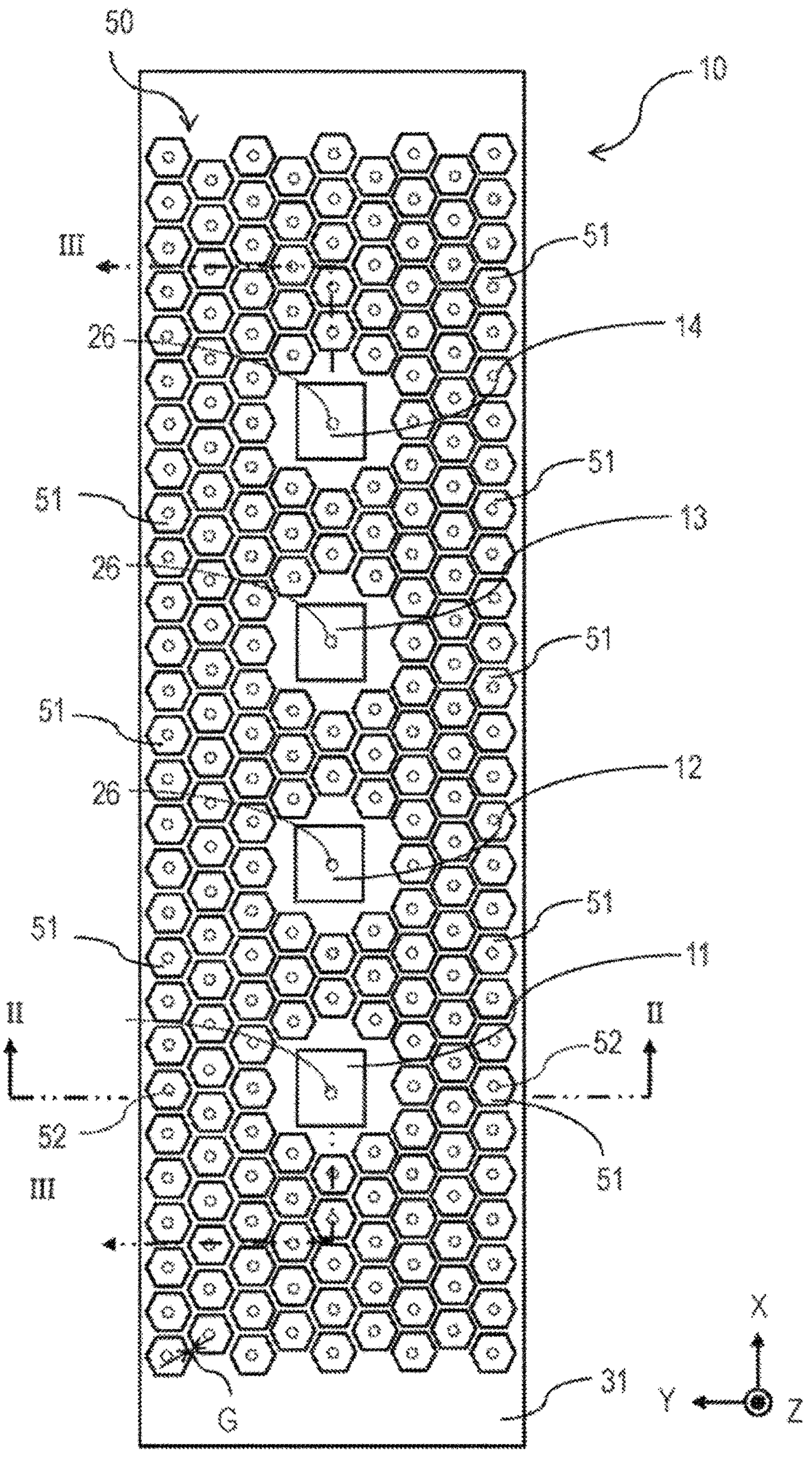
FIG. 1 is a plan view of an array antenna.

Problems to Be Solved by the Present Disclosure

An array antenna is used for beam forming, for example. Through beam forming, directivity of a beam to a communication counterpart can be enhanced.

The present inventors have newly found the following. That is, when a high frequency such as in a quasi-millimeter wave band or a millimeter wave band is used, when compared with a case where a frequency, e.g., a frequency of about 2 GHz, that is lower than the quasi-millimeter wave band or the millimeter wave band is used, the beam radiated from the array antenna is easily disturbed depending on directions since the directivity of each antenna element forming the array antenna is randomly different. That is, when a high frequency such as that in the quasi-millimeter wave band or the millimeter wave band is used, the beam radiated from the array antenna has non-uniformity dependent on directions. When the directivity of each antenna element is different, a combined gain is also reduced when compared with a case where the directivity of each antenna element is the same.

When the beam has non-uniformity, there is a risk that communication performance is impaired depending on the direction of the beam. Therefore, it is desired to ensure uniformity of the beam formed by the array antenna.

Effects of the Present Disclosure

According to the present disclosure, uniformity of the beam formed by an array antenna can be ensured.

Outline of Embodiment of the Present Disclosure

Hereinafter, the outline of an embodiment of the present disclosure will be listed and described.

(1) An array antenna according to an embodiment includes a plurality of antenna elements, a ground, and a dielectric provided between the plurality of antenna elements and the ground. The dielectric is implemented as a dielectric substrate being a solid, for example. However, the dielectric may be a gas such as air.

The dielectric according to the embodiment has an electrical length, from the plurality of antenna elements to the ground, of not less than 0.03. The array antenna according to the embodiment includes a shield structure provided at least between the plurality of antenna elements and configured to shield a radio wave radiated from each antenna element. Even when the frequency is increased to an extent that the electrical length of the dielectric becomes not less than 0.03, uniformity of the beam formed by the array antenna can be ensured by the shield structure.

(2) Preferably, a plurality of antenna elements include a first antenna element and a second antenna element arranged so as to be aligned in a first direction, the shield structure includes a first region, a second region, and a third region, the first region is provided between the first antenna element and the second antenna element, the second region is provided so as to extend from the first region toward a second direction orthogonal to the first direction, and the third region is provided from the second region so as to extend in parallel to the first direction, and is positioned in a periphery of each of the first antenna element and the second antenna element. In this case, uniformity of the beam can be more enhanced.

(3) Preferably, the shield structure is provided so as to surround an entire periphery of at least one antenna element included in a plurality of antenna elements. In this case, uniformity of the beam can be further enhanced.

(4) Preferably, the shield structure is provided so as to surround an entire periphery of each of a plurality of antenna elements. In this case, uniformity of the beam can be further enhanced.

(5) Preferably, an interval between a plurality of antenna elements is not greater than 1.5λ (λ is a free-space wavelength of the radio wave). In this case, an appropriate antenna element interval as an array antenna can be obtained.

(6) Preferably, the shield structure has a structure in which a plurality of unit cells are arrayed in a periodic manner. In this case, the radio wave can be effectively shielded.

(7) Preferably, each unit cell is a hexagonal cell. In this case, the radio wave is more assuredly shielded.

(8) Preferably, the dielectric has a physical length, from the plurality of antenna elements to the ground, of not greater than 3 mm. In this case, the dielectric can be made sufficiently thin, and when the dielectric is implemented as a flexible substrate, for example, flexibility of the dielectric is increased.

(9) Preferably, the dielectric has a physical length, from the plurality of antenna elements to the ground, of not less than 0.01 mm. When the physical length from the plurality of antenna elements to the ground is not less than 0.01 mm, a band can be ensured.

(10) Preferably, the radio wave has a frequency of not lower than 20 GHz. In this case, although uniformity of the beam is more easily disturbed since the frequency is high, uniformity of the beam can be ensured by the shield structure.

Details of Embodiment of the Present Disclosure

Hereinafter, an embodiment of the present invention will be described with reference to the drawings. In the drawings, at least some parts of the embodiment described below may be combined as desired.

Figure 2:
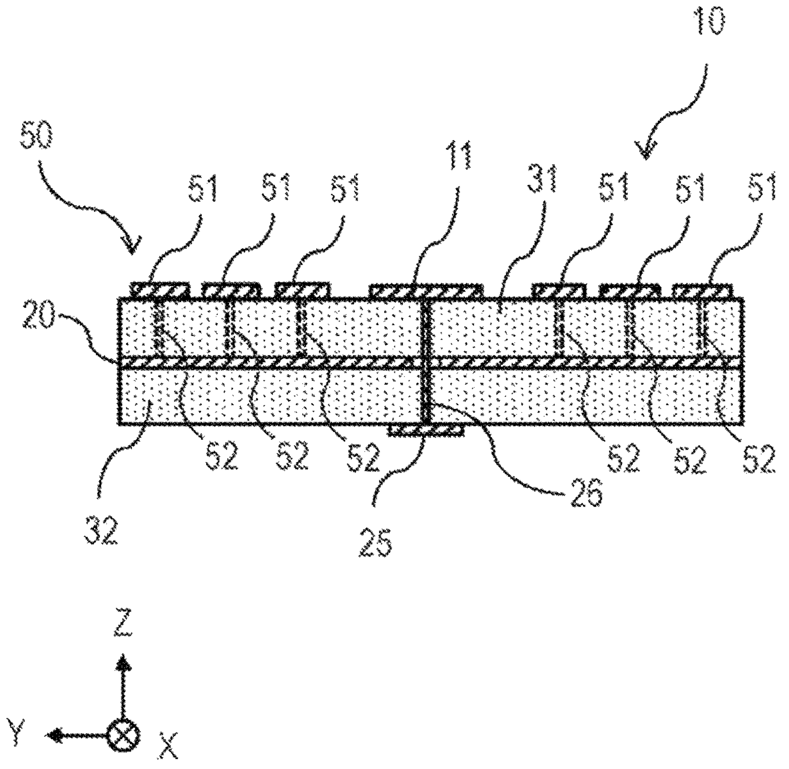
FIG. 2 is a cross-sectional view along a line II-II of the array antenna.
Figure 3:
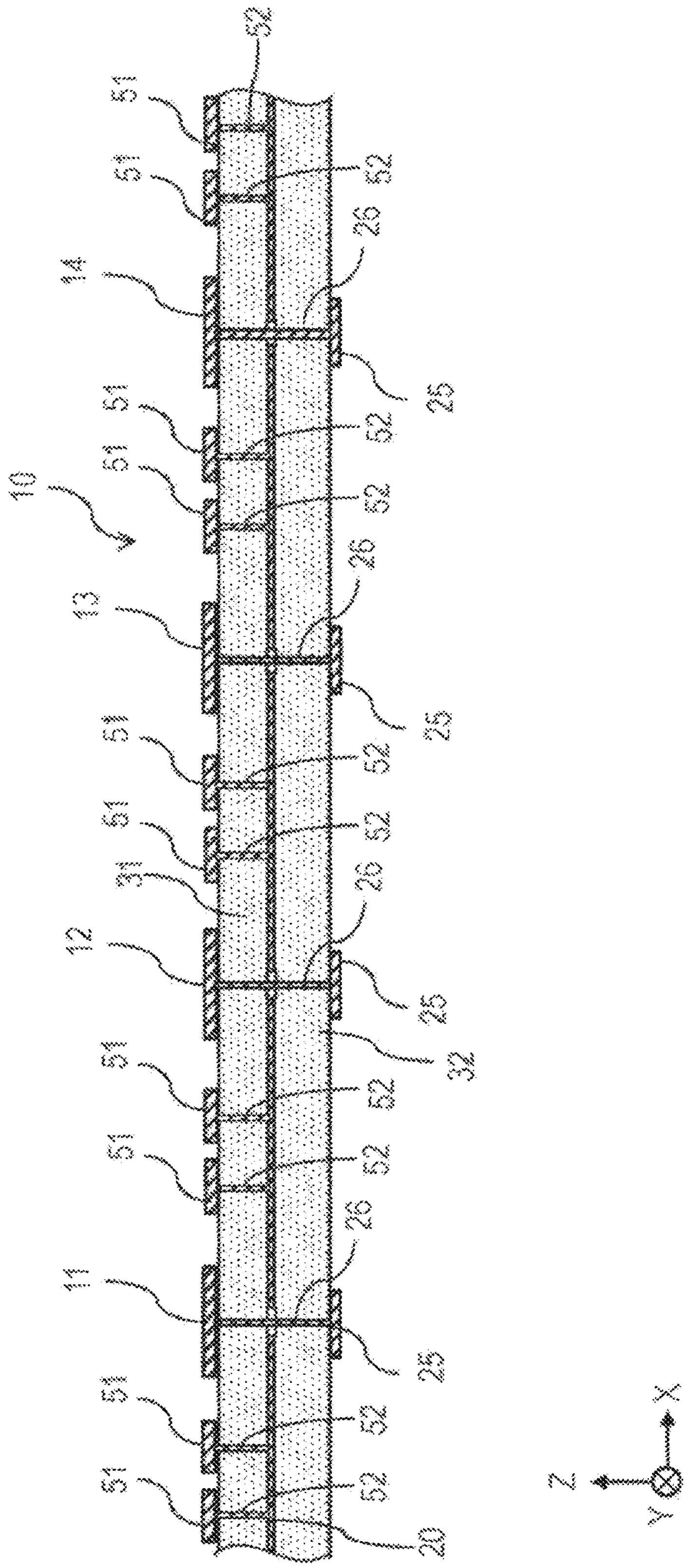
FIG. 3 is a cross-sectional view along a line III-III of the array antenna.

FIG. 1 to FIG. 3 show an array antenna 10 according to the embodiment. The array antenna 10 according to the embodiment is provided to, for example, a mobile station mounted to a mobile body such as a vehicle. The mobile station performs wireless communication with a base station. The wireless communication is communication using the 5th-generation mobile communication system (5G), for example. The mobile station can, while moving, concentrate a beam to the base station through beam forming.

The array antenna 10 includes a plurality of antenna elements 11, 12, 13, 14. The array antenna 10 is used for beam forming, for example. The array antenna 10 may be used for gain combining, other than for beam forming. The beam forming may be analog beam forming or may be digital beam forming. The analog beam forming is a method in which the phase of a radio wave at each antenna element is caused to be different in an analog manner by using a phase shifter, to change the beam direction. The digital beam forming is a method in which the phases/amplitudes at respective antenna elements are combined in a digital manner. In FIG. 1, the array antenna 10 includes four antenna elements 11, 12, 13, 14 arrayed in a one-dimensional manner with intervals therebetween in an X-direction. Hereinafter, it is assumed that the array antenna 10 shown in FIG. 1 is used with the X-direction defined as the horizontal direction and the Y-direction orthogonal to the X-direction defined as the vertical direction. The plurality of antenna elements may be arrayed in a two-dimensional manner in an X-Y plane. In FIG. 1, a Z-direction is the thickness direction of the array antenna 10.

The plurality of antenna elements 11, 12, 13, 14 according to the embodiment are arranged at equal intervals. The upper limit of the interval between adjacent ones of the plurality of antenna elements 11, 12, 13, 14 is, for example, 1.5λ (λ is the free-space wavelength of a radio wave radiated from an antenna element), preferably 1.0λ and more preferably 0.8λ. The lower limit of the interval between the plurality of antenna elements 11, 12, 13, 14 is 0.6λ, for example, and preferably 0.7λ. The interval between the plurality of antenna elements 11, 12, 13, 14 is 0.75λ, as an example. The interval of adjacent ones of the plurality of antenna elements 11, 12, 13, 14 is preferably set in a range not higher than one upper limit selected from the above-described plurality of upper limits and not lower than one lower limit selected from the above-described plurality of lower limits.

The interval between the plurality of antenna elements 11, 12, 13, 14 preferably has such a magnitude that suppresses occurrence of a grating lobe at the time of array combining and that allows a later-described shield structure 50 to be arranged between the antenna elements 11, 12, 13, 14.

The radio wave radiated from the array antenna 10 according to the embodiment has a relatively high frequency. The radio wave radiated from the array antenna 10 is preferably in the quasi-millimeter wave band or the millimeter wave band. More specifically, the lower limit of the frequency of the radio wave radiated from the array antenna 10 is 3 GHz, for example, more preferably 5 GHz, and further preferably 10 GHz. At a high frequency, a wide frequency band width can be used. Therefore, when the frequency of the radio wave radiated from the array antenna 10 is high, high-speed communication is enabled. The lower limit of the frequency of the radio wave radiated from the array antenna 10 is further preferably 20 GHz, further preferably 24 GHz, from the viewpoint that the radio wave is in the quasi-millimeter wave band or the millimeter wave band.

The upper limit of the frequency of the radio wave radiated from the array antenna. 10 is not limited in particular, but is, for example, 300 GHz, preferably 200 GHz, more preferably 100 GHz, and further preferably 50 GHz. The frequency of the radio wave radiated from the array antenna 10 is preferably set in a range not higher than one upper limit selected from the above-described plurality of upper limits and not lower than one lower limit selected from the above-described plurality of lower limits.

In the description below, it is assumed that the frequency of the radio wave radiated from the array antenna 10 is in the 28 GHz band for the 5th-generation mobile communication system.

As shown in FIG. 2 and FIG. 3, the array antenna 10 according to the embodiment includes a first dielectric layer 31 having an upper face (first face) provided with the plurality of antenna elements 11, 12, 13, 14 and a lower face (second face) provided with a ground 20. The ground 20 is a portion having a reference potential.

The array antenna 10 according to the embodiment is implemented as a planar antenna. The planar antenna has a structure that includes antenna elements formed at one face of a dielectric substrate and a ground formed at the other face of the dielectric substrate. That is, the antenna elements 11, 12, 13, 14, the first dielectric layer 31, and the ground 20 according to the embodiment form a planar antenna. As an example, the shown planar antenna is implemented as a patch antenna. The patch antenna is also referred to as a microstrip antenna.

The array antenna 10 according to the embodiment includes a second dielectric layer 32. The second dielectric layer 32 is provided so as to sandwich the ground 20 between the second dielectric layer 32 and the first dielectric layer 31. That is, the ground 20 is provided at the upper face (first face) of the second dielectric layer 32. In the second dielectric layer 32, at the lower face (second face) on the side opposite to the ground 20, microstrip lines 25 serving as feeder lines to the antenna elements 11, 12, 13, 14 are provided. Each microstrip line 25 and a corresponding antenna element 11, 12, 13, 14 are connected to each other by a via 26. The via 26 allows the microstrip line 25 and the antenna element 11, 12, 13, 14 to be conductive with each other. The via 26 may be formed as a through-hole of which the inside is hollow, or the via 26 may have the inside thereof filled with a synthetic resin or a metal body. To each of the plurality of antenna elements 11, 12, 13, 14, both of a horizontally polarized wave (H-polarized wave) and a vertically polarized wave (V-polarized wave) are inputted. The feeder lines to the antenna elements 11, 12, 13, 14 may be provided at the upper face (first face) of the first dielectric layer 31. That is, the antenna elements 11, 12, 13, 14 and the feeder lines thereto may be provided at the same face. In this case, the shield structure 50 described later is arranged so as to avoid the feeder lines.

The array antenna 10 according to the embodiment includes the shield structure 50 configured to shield a radio wave radiated from each antenna element 11, 12, 13, 14. The shield structure 50 according to the embodiment has a periodic structure that blocks a frequency band including the frequency of the radio wave radiated from the antenna element 11, 12, 13, 14. The shield structure 50 is an electromagnetic band gap (EBG) structure shown in FIG. 1 to FIG. 3, for example. As shown in FIG. 1, the shield structure 50 is provided so as to surround the entire periphery of each of the plurality of antenna elements 11, 12, 13, 14.

The shield structure 50 (EBG structure) shown in FIG. 2 and FIG. 3 includes a plurality of unit cells 51 formed at the upper face (first face) of the first dielectric layer 31 and vias 52 connecting the respective unit cells 51 to the ground 20. Each unit cell 51 is a conductor such as copper. For example, the unit cell 51 is a hexagonal plate viewed in the Z-direction. The EBG structure including the unit cell 51 and the via 52 as in FIG. 2 and FIG. 3 is referred to as a mushroom structure. As the shield structure 50, a via-less EBG structure in which the via 52 is omitted, as shown in PATENT LITERATURES 1, 2, may be adopted.

The plurality of unit cells 51 are arrayed in a periodic manner with a gap G therebetween. The unit cell 51 shown in FIG. 1 preferably has a regular hexagon shape, but may have a square shape as described later. The gap between the unit cells 51 is preferably uniform. Preferably, the interval in the up-down (the Y-direction) direction and the left-right (the X-direction) direction between the antenna element 11, 12, 13, 14 and the shield structure 50 is even without being biased.

In the array of the plurality of unit cells 51, a plurality of unit-cell non-arrangement regions for arranging the antenna elements 11, 12, 13, 14 are formed. The antenna elements 11, 12, 13, 14 are arranged in the unit-cell non-arrangement regions. Since the antenna elements 11, 12, 13, 14 are arranged in the unit-cell non-arrangement regions, the shield structure 50 surrounds the entire periphery of each of the plurality of antenna elements 11, 12, 13, 14. As a result, the shield structure 50 is provided between the plurality of antenna elements 11, 12, 13, 14.

In a planar antenna such as a patch antenna, a surface wave mode in which a radio wave radiated from each antenna element propagates at the ground occurs. The shield structure 50 according to the embodiment suppresses propagation of the surface wave radiated from the antenna element 11, 12, 13, 14.

The shield structure 50 present between the plurality of antenna elements 11, 12, 13, 14 preferably has at least one unit cell 51 in the X-direction being the direction in which the plurality of antenna elements 11, 12, 13, 14 are arranged, and preferably has two unit cells 51 in the X-direction as shown in FIG. 1. When at least two unit cells are present in the X-direction, at least one gap G is present in the X-direction, whereby the suppression effect of propagation of the surface wave in the X-direction is enhanced. The shield structure 50 present between the plurality of antenna elements 11, 12, 13, 14 preferably has at least one unit cell, preferably two unit cells as shown in FIG. 2, in the Y-direction orthogonal to the X-direction. When at least two unit cells are present in the Y-direction, at least one gap G is present in the Y-direction, whereby the suppression effect of propagation of the surface wave in the Y-direction is enhanced.

The array antenna 10 according to the embodiment is formed at a rigid substrate, for example. The array antenna 10 may be formed at a flexible substrate. When the substrate at which the array antenna 10 is formed is thin, flexibility is increased. The material of the substrate is not limited in particular as long as the material is a dielectric.

The first dielectric layer 31 and the second dielectric layer 32 are each implemented by a dielectric such as a polyimide. The dielectric may be a liquid crystal polymer, a PPE resin, or a fluororesin, for example. When bending deformation is to be allowed, the first dielectric layer 31 and the second dielectric layer 32 are each implemented as a thin film-shaped member.

Since the first dielectric layer 31 is present between the ground 20 and the antenna elements 11, 12, 13, 14, the first dielectric layer 31 influences characteristics of the array antenna 10 to a great extent.

The upper limit of the thickness (the length in the Z-direction) as the physical length of the first dielectric layer 31 in a film shape is, for example, 3 mm, more preferably 2 mm, further preferably 1.5 mm, further preferably 1 mm, and further preferably 0.5 mm. When the first dielectric layer 31 is as thin as above, flexibility can be ensured.

The lower limit of the thickness (the length in the Z-direction) as the physical length of the first dielectric layer 31 is, for example, 0.01 mm, more preferably 0.05 mm, further preferably 0.1 mm, further preferably 0.2 mm, and further preferably 0.3 mm. When the thickness of the first dielectric layer 31 is greater than the lower limit described above, the thickness of the first dielectric layer 31 can be made relatively large, and a wide communication band can be ensured, which is advantageous. The thickness as the physical length of the first dielectric layer 31 is preferably set in a range not higher than one upper limit selected from the above-described plurality of upper limits and not lower than one lower limit selected from the above-described plurality of lower limits.

The relative dielectric constant of the first dielectric layer 31 is not limited in particular as long as the relative dielectric constant is not less than 1. However, the upper limit of the relative dielectric constant is, for example, 10 and more preferably 5. The relative dielectric constant of the first dielectric layer 31 is preferably in a range of 1 to 5, and more preferably in a range of 1.5 to 4.5.

The thickness as the electrical length of the first dielectric layer 31, i.e., the electrical length from the plurality of antenna elements 11, 12, 13, 14 to the ground 20, is preferably not less than 0.03. The lower limit of the electrical length from the plurality of antenna elements 11, 12, 13, 14 to the ground 20 is more preferably 0.05, further preferably 0.1, and further preferably 0.15.

The upper limit of the electrical length from the plurality of antenna elements 11, 12, 13, 14 to the ground 20 is preferably 1, more preferably 0.7, further preferably 0.5, further preferably 0.3, and further preferably 0.2. The electrical length from the plurality of antenna elements 11, 12, 13, 14 to the ground 20 is preferably set in a range not higher than one upper limit selected from the above-described plurality of upper limits and not lower than one lower limit selected from the above-described plurality of lower limits.

Here, the electrical length is defined by the thickness (physical length) t of the first dielectric layer 31, a vacuum wavelength λ0, and a relative dielectric constant εr, and is calculated as the ratio of the thickness t of the first dielectric layer 31 with respect to the vacuum wavelength λ0, as shown in formula (1) below.

$$\text{Electrical length}=(t/\lambda 0)\times\sqrt{\varepsilon r} \quad (1)$$

The electrical length increases in accordance with increase in the thickness t of the first dielectric layer 31. Even when the thickness t of the first dielectric layer 31 is the same, the electrical length increases in accordance with increase in the relative dielectric constant. Even when the thickness t of the first dielectric layer 31 is the same, the electrical length increases in accordance with decrease in the wavelength.

For example, in a case where the frequency of the radio wave radiated from the array antenna 10 is 28 GHz, the thickness t of the first dielectric layer 31 is 0.5 mm, and the relative dielectric constant of the first dielectric layer 31 is 3.6 (case 1: t=0.5 mm), the electrical length (the electrical length from the plurality of antenna elements 11, 13, 14 to the ground 20) of the first dielectric layer 31 becomes 0.0886, which is a value not less than 0.03. When the light velocity is assumed to be 299792458 m/s, the vacuum wavelength λ0 of the radio wave having a frequency of 28 GHz is 10.7 mm.

Meanwhile, in a case where the thickness t of the first dielectric layer 31 is reduced to be as thin as 0.1 mm, and the other conditions are the same as above (case 2: t=0.1 mm), the electrical length (the electrical length from the plurality of antenna elements 11, 12, 13, 14 to the ground 20) of the first dielectric layer 31 is 0.0177, which is a value less than 0.03.

When the voltage standing wave ratio (VSWR) of the array antenna 10 of each of case 1 and case 2 was calculated, it was confirmed that case 1 had a broader band performance. That is, in case 1, the frequency range in which VSWR was less than 1.5 was 1 G[Hz] with a center frequency of 28 GHz, whereas said frequency range was 0.22 G[Hz] in case 2. The fractional bandwidth (center frequency ratio) at which VSWR was less than 1.5 was 3.6%, in case 1, which corresponds to a broad band, whereas said fractional bandwidth was 0.79%, in case 2, which cannot ensure a sufficient band. The fractional bandwidth (center frequency ratio) at which VSWR was less than 2 was 6.1% in case 1, whereas said fractional bandwidth was 1.4% in case 2.

Thus, even when the first dielectric layer 31 that is thin is used in order to ensure flexibility, it is preferable that the thickness of the first dielectric layer 31 is as large as possible in order to ensure a broad band. According to the examination by the present inventors, the thickness of the first dielectric layer 31 is preferably not less than 0.03 in terms of the electrical length from the viewpoint of ensuring a broad band.

Meanwhile, as described above, the present inventors have newly found that, when a high frequency such as that in the quasi-millimeter wave band or the millimeter wave band is used, when compared with a case where a frequency, e.g., a frequency of about 2 GHz, that is lower than the quasi-millimeter wave band or the millimeter wave band is used, the beam radiated from the array antenna is easily disturbed depending on directions.

The present inventors have found that the non-uniformity of the beam is caused because the radio wave radiated from each antenna element 11, 12, 13, 14 propagates at the ground 20 due to the surface wave mode. The radio wave generated from each antenna element 11, 12, 13, 14 is not only radiated toward the communication counterpart but also propagates, due to the surface wave mode, at the surface of the ground 20 arranged to the rear of the antenna element 11, 12, 13, 14. Due to the surface wave mode, a radio wave radiated from an antenna element 12 reaches another antenna element 11, 13, 14, whereby inter-element coupling occurs. Further, unnecessary radiation of radio waves from ground end portions also occurs. As a result, directivity of each antenna element is disturbed. The way of disturbance of the directivity of each antenna element is different for each antenna element. Accordingly, the beam formed by the array antenna is disturbed.

Conventionally, such disturbance of the beam did not pose a problem in an array antenna in which a frequency, e.g., a frequency of about 2 GHz, that is lower than the quasi-millimeter wave band or the millimeter wave band is used. However, when a frequency as high as that in the quasi-millimeter wave band or the millimeter wave band is used, propagation of the radio wave due to the surface wave easily occurs, thus causing disturbance of the beam.

That is, even when the physical length in the thickness of the dielectric provided between the antenna element and the ground is the same, when the frequency of the radio wave is increased and thus the wavelength is short, the electrical length of the dielectric is increased. When the electrical length of the dielectric is increased, propagation of the radio wave due to the surface wave easily occurs.

For example, in a case where the thickness (physical length) t of the first dielectric layer 31 is 0.3 mm, and the relative dielectric constant of the first dielectric layer 31 is 2, when the frequency is 2 GHz (vacuum wavelength $\lambda 0$=149.9 mm), the electrical length in the thickness of the first dielectric layer 31 is only 0.0028 while the physical length of the first dielectric layer 31 is also very small. Meanwhile, even in a case of the same first dielectric layer 31, when the frequency is 28 GHz (vacuum wavelength $\lambda 0$=10.7 mm), the electrical length in the thickness of the first dielectric layer 31 is increased to be 0.0396.

Thus, when the frequency of the radio wave radiated from the antenna element 11, 12, 13, 14 is high to an extent that the electrical length of the dielectric becomes not less than 0.03, propagation of the radio wave due to the surface wave easily occurs due to the largeness of the electrical length of the dielectric. Therefore, the directivity of each antenna element is disturbed. As a result, uniformity of the beam formed by the array antenna is impaired.

In order to ensure the uniformity of the beam, it is desired: that the directivity of each antenna element 11, 12, 13, 14 is in left-right symmetry and is not disturbed; that the directivities (amplitudes/phases) and the gains of the antenna elements 11, 12, 13, 14 are aligned; and that isolation between the antenna elements is sufficient. In the first two, disturbance is more easily caused due to the surface wave mode.

Figure 4:
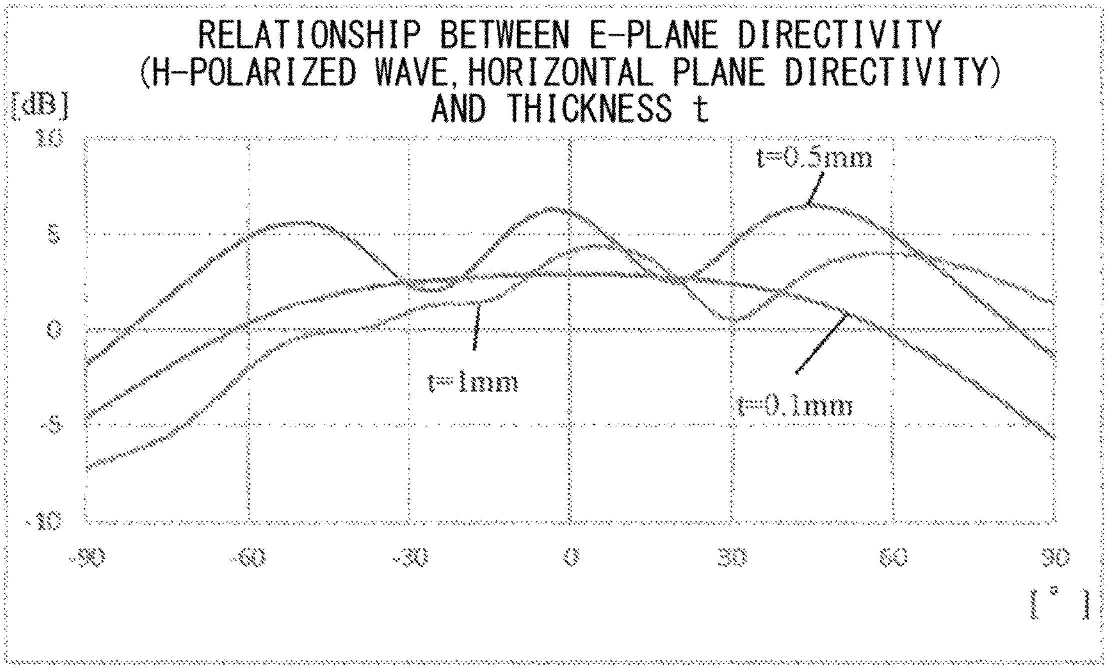
FIG. 4 is a graph showing E-plane directivity of an antenna element.
Figure 5:
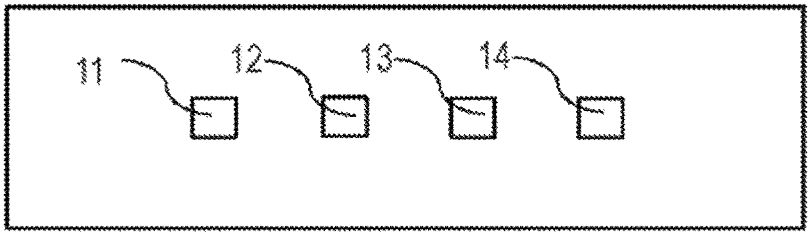
FIG. 5 is a schematic diagram showing EBG arrays.
Figure 5:
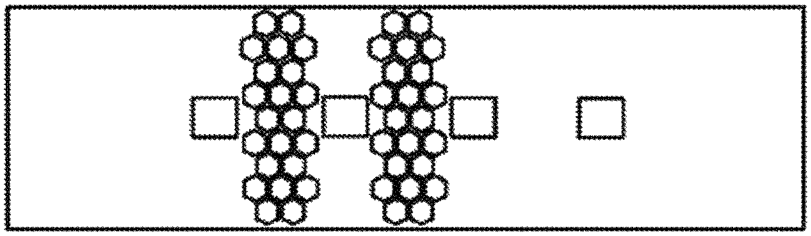
Figure 5:
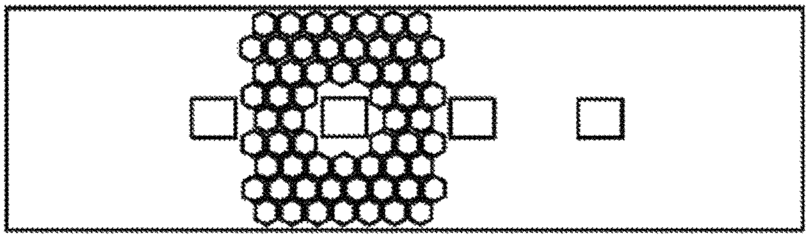
Figure 5:
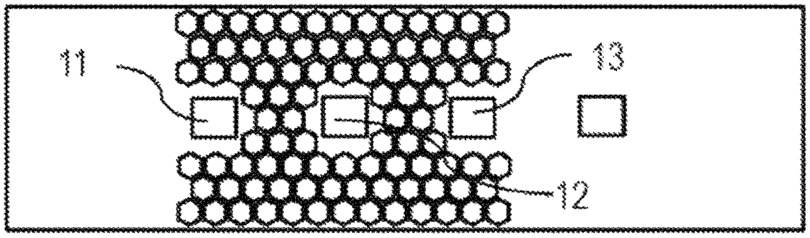
Figure 5:
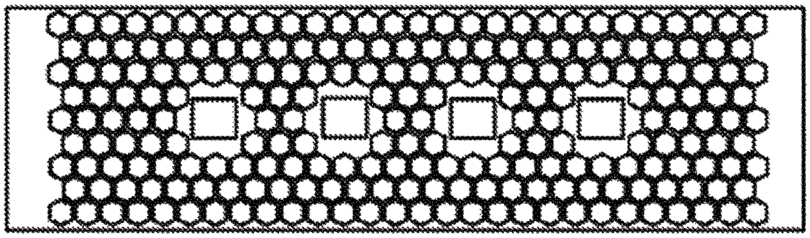

FIG. 4 shows a relationship between an E-plane directivity (H-polarized wave, horizontal plane directivity) of a single antenna element 11 and the thickness t of the first dielectric layer 31. Here, the H-polarized wave is a horizontally polarized wave and the horizontal direction is the X-direction in FIG. 1. The horizontal plane directivity is the directivity in an XZ-plane (horizontal plane) in FIG. 1. The shield structure 50 is not present. In FIG. 4, the thickness t was set to three kinds, i.e., 1 mm, 0.5 mm, and 0.1 mm. The frequency of the radio wave was 28 GHz, and the relative dielectric constant of the first dielectric layer 31 was set to be 3.6. t=0.5 mm corresponds to case 1 described above, and t=0.1 mm corresponds to case 2.

In the case of t=0.1 mm, since the first dielectric layer 31 is relatively thin, there is substantially no disturbance of the directivity even when the frequency is as high as 28 GHz. In contrast to this, when t=0.5 mm, there is disturbance around a peak, and when t=1 mm, there is also left-right asymmetry.

Thus, when the frequency is increased, the directivity of the antenna element 11 is disturbed in accordance with increase in the thickness of the first dielectric layer 31. That is, it has been revealed that disturbance of the directivity of the antenna element 11 occurs when the thickness of the first dielectric layer 31 is increased with respect to the wavelength of the radio wave.

With regard to the above problem, in the array antenna 10 according to the embodiment, due to the shield structure 50 provided between the plurality of antenna elements 11, 12, 13, 14, propagation of radio waves between the antenna elements 11, 12, 13, 14 is suppressed, whereby the directivity of each antenna element 11, 12, 13, 14 can be prevented from being disturbed. Therefore, uniformity of the beam formed by the array antenna can be ensured.

FIG. 5 to FIG. 13 show results of examination as to the directivity disturbance improvement effect by the shield structure 50. Here, simulation was performed with respect to five kinds of array antennas 10, i.e., Nos. 1-1, 1-2, 1-3, 1-4, 1-5. In the simulation, the directivity of the second antenna element 12 was obtained. The frequency was set to 28 GHz. The thickness t of the first dielectric layer 31 was set to 0.5 mm, and the relative dielectric constant of the first dielectric layer 31 was set to 3.6.

No. 1-5 is the same as the array antenna 10 shown in FIG. 1 to FIG. 3, and the shield structure 50 is provided around all of the antenna elements 11, 12, 13, 14.

Figure 6:
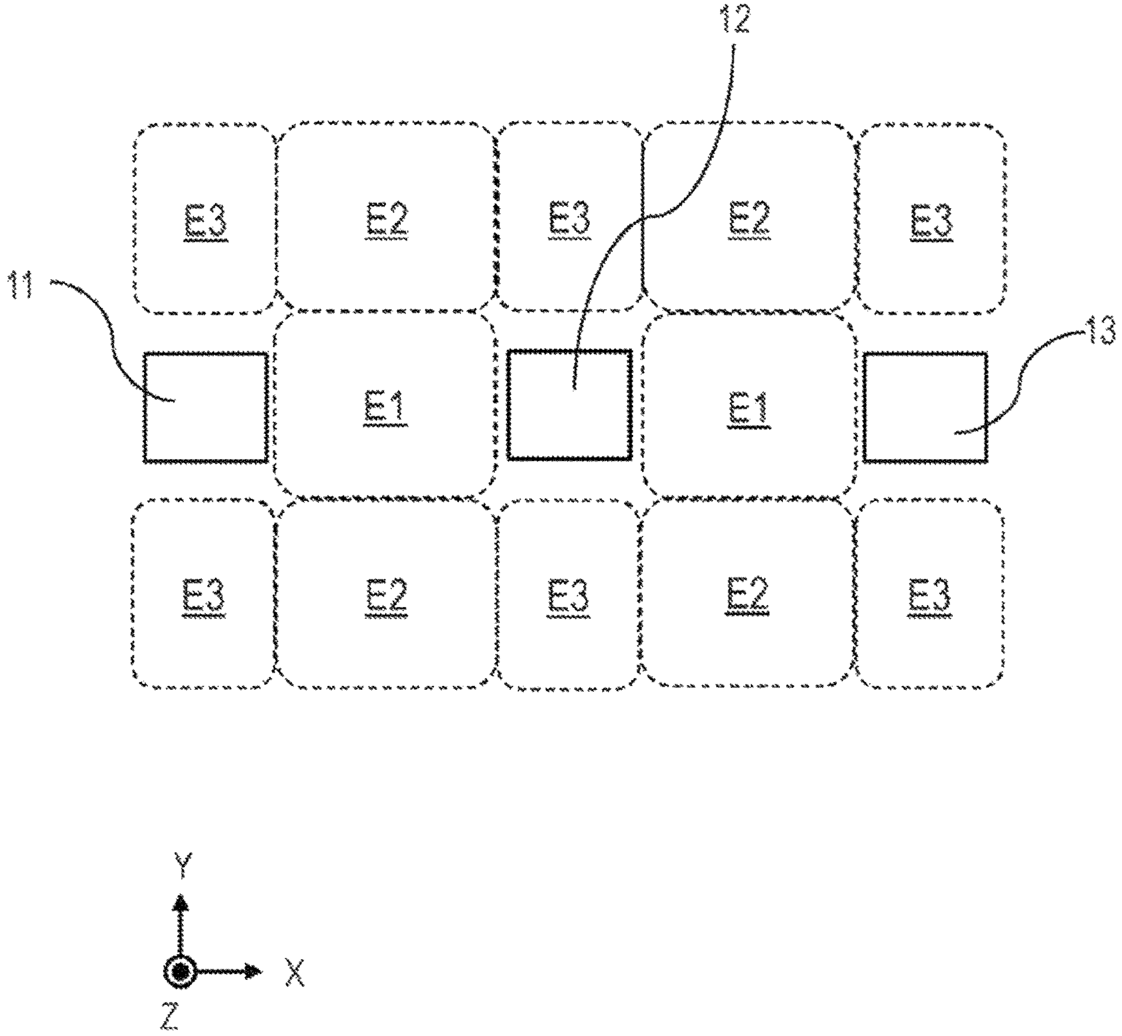
FIG. 6 is a diagram for describing regions of EBG.

In No. 1-4, around the antenna element 12, the shield structure 50 is arranged in first regions E1, second regions E2, and third regions E3 shown in FIG. 6. A first region E1 is arranged between the first antenna element 11 and the second antenna element 12 which are arranged so as to be aligned in the X-direction (first direction). A first region E1 is also arranged between the second antenna element 12 and the third antenna element 13 which are arranged so as to be aligned in the X-direction (first direction).

Each second region E2 is provided so as to extend from a corresponding first region E1 toward the Y-direction (second direction) orthogonal to the X-direction (first direction). The second region E2 is arranged on both sides in the Y-direction of the first region E1.

Each third region E3 is provided so as to extend from a corresponding second region E2 in parallel to the X-direction (first direction) and is positioned in the periphery of the first antenna element 11, the second antenna element 12, and the third antenna element 13 (and the fourth antenna element 14). The third region E3 is arranged between a plurality of second regions E2.

In No. 1-3, the third regions E3 adjacent to the first antenna element 11 and the third antenna element 13 are eliminated from the shield structure 50 of No. 1-4 such that the shield structure 50 surrounds the entire periphery of the second antenna element 12.

In No. 1-2, the third regions E3 are eliminated from the shield structure 50 of No. 1-3.

No. 1-1 does not have the shield structure 50.

Figure 7:
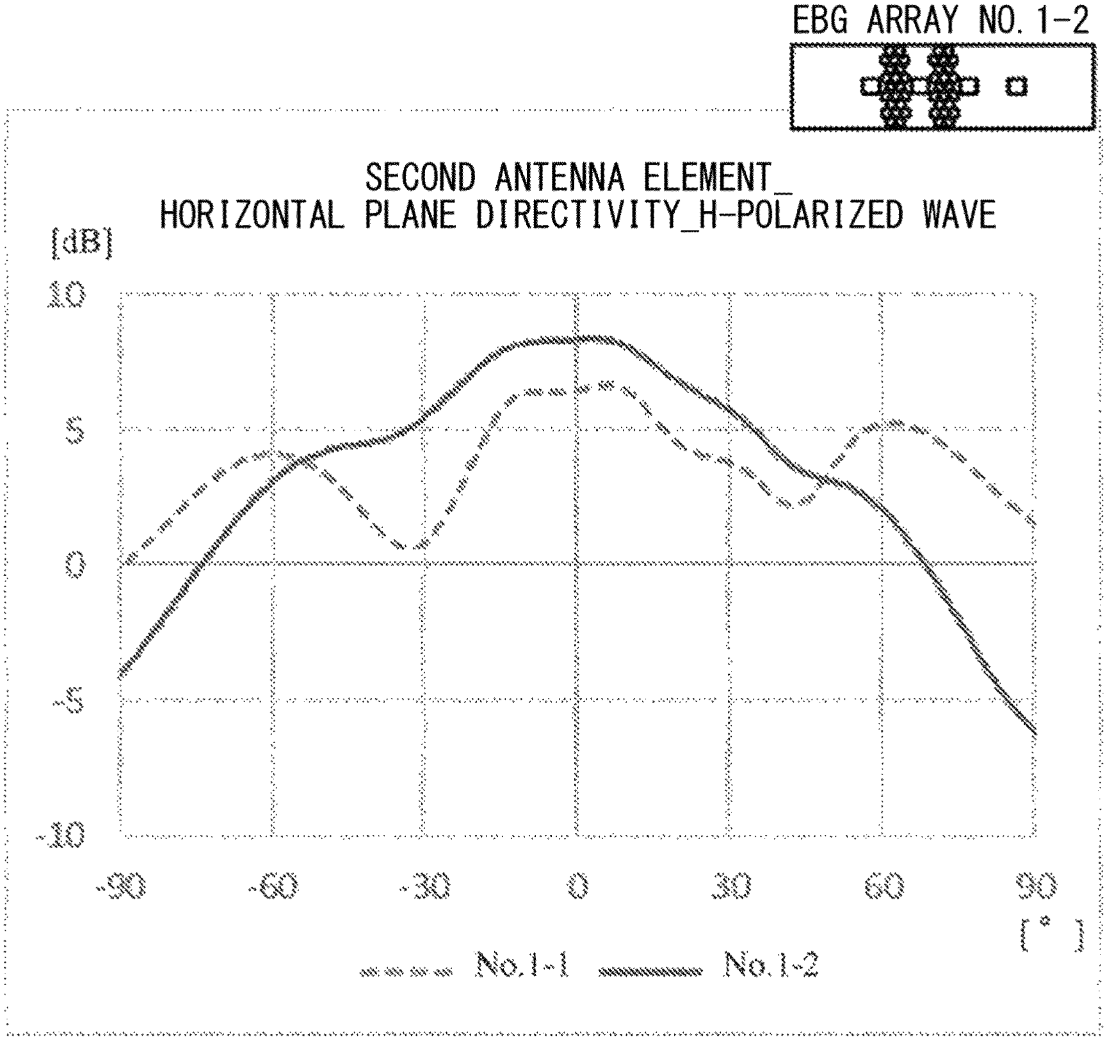
FIG. 7 is a characteristic diagram showing directivity of a second antenna element.
Figure 8:
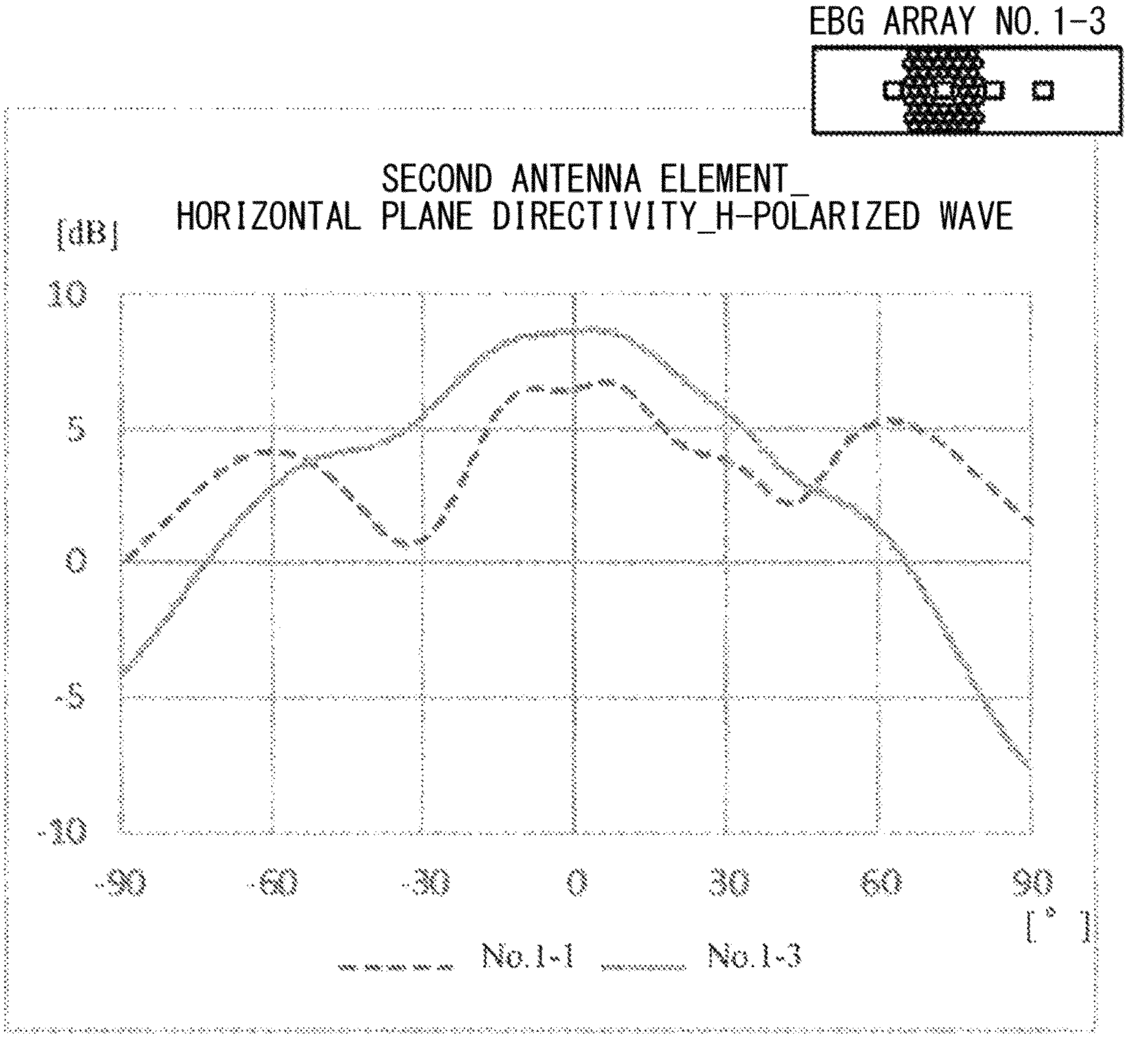
FIG. 8 is a characteristic diagram showing directivity of the second antenna element.
Figure 9:
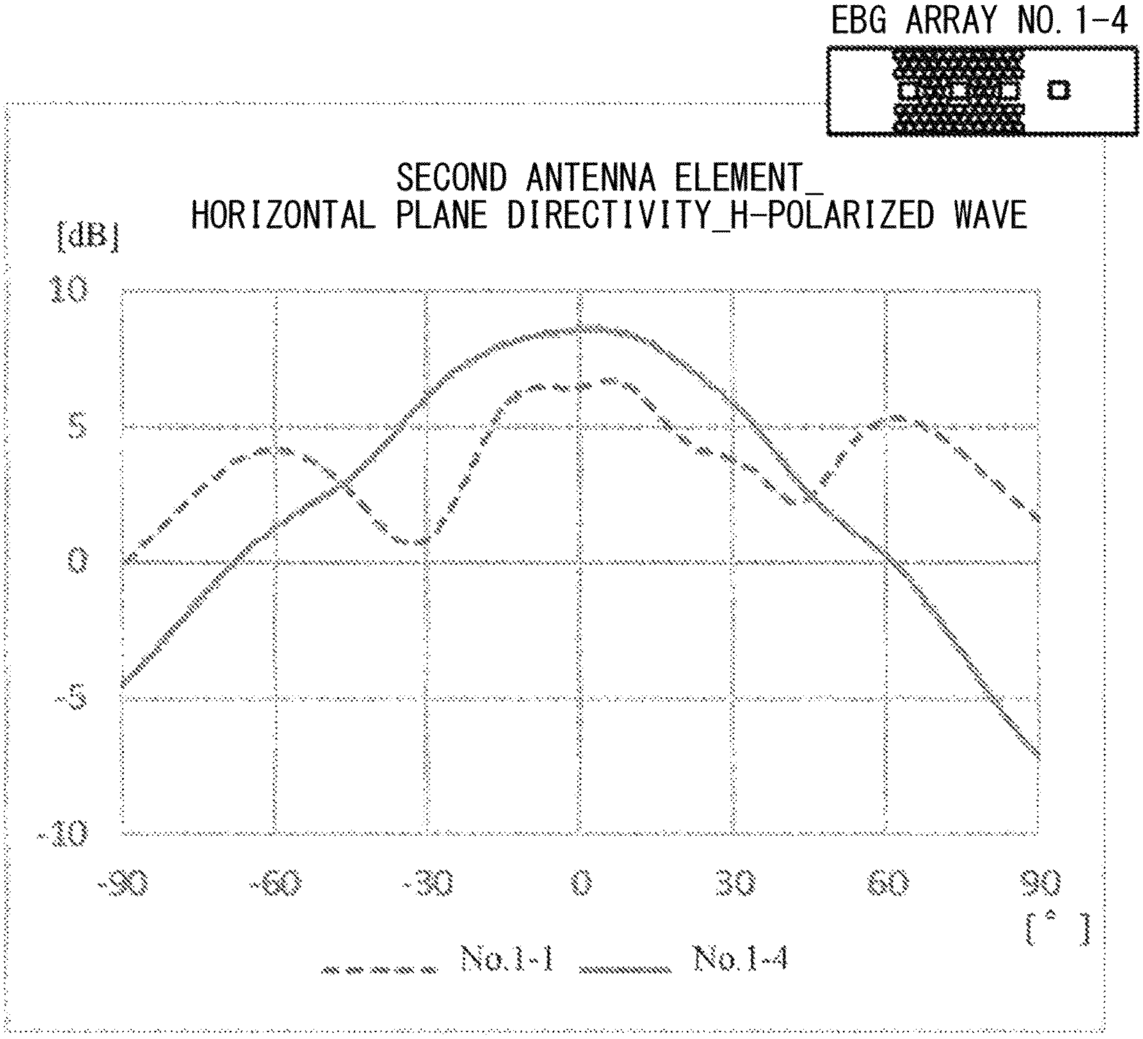
FIG. 9 is a characteristic diagram showing directivity of the second antenna element.
Figure 10:
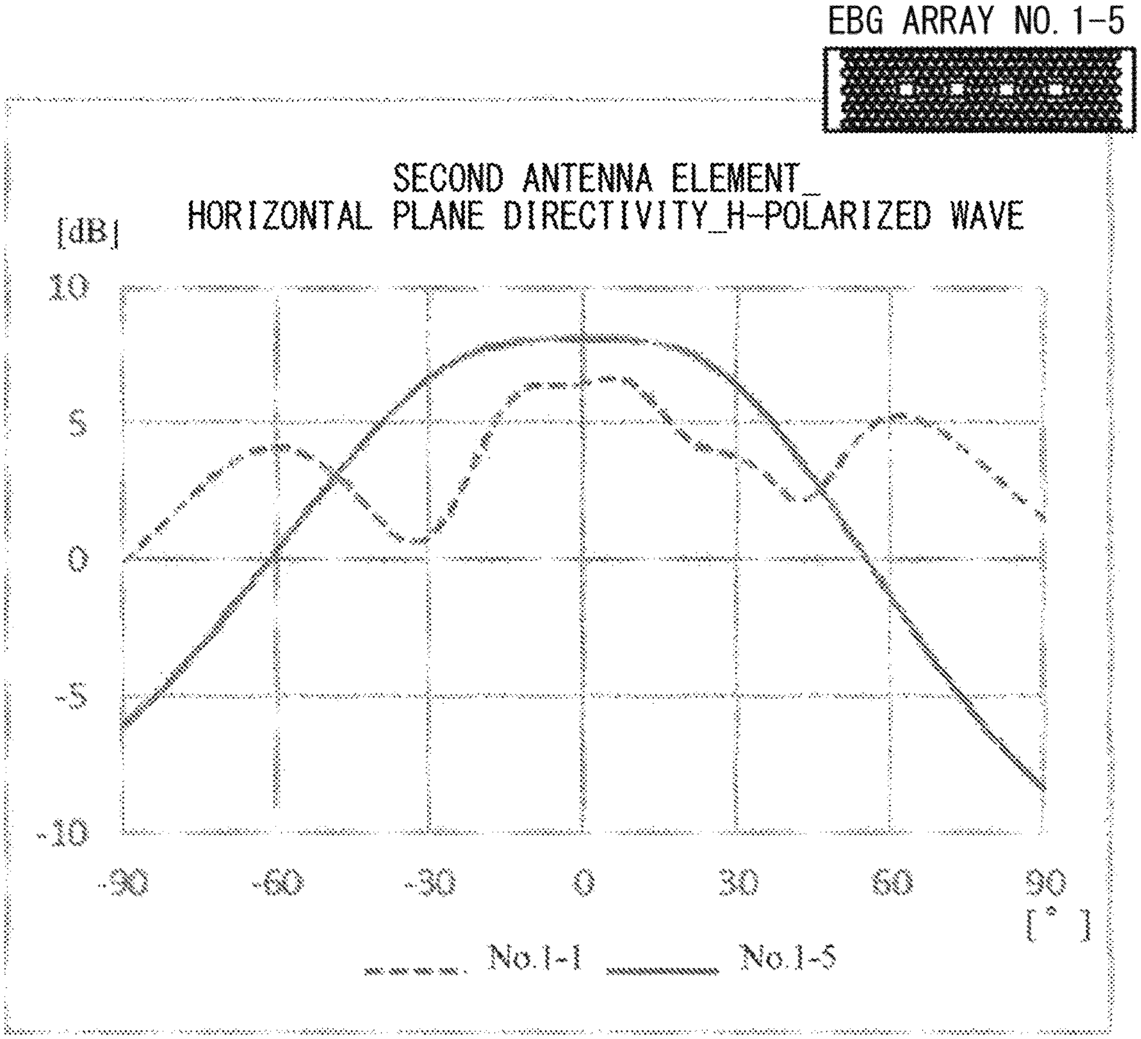
FIG. 10 is a characteristic diagram showing directivity of the second antenna element.

FIG. 7 shows the directivity (horizontal plane directivity; H-polarized wave) of the second antenna element 12 in No, 1-2 and No. 1-1. FIG. 8 shows the directivity (horizontal plane directivity; H-polarized wave) of the second antenna element 12 in No. 1-3 and No. 1-1. FIG. 9 shows the directivity (horizontal plane directivity; H-polarized wave) of the second antenna element 12 in No. 1-4 and No. 1-1. FIG. 10 shows the directivity (horizontal plane directivity; H-polarized wave) of the second antenna element 12 in No, 1-5 and No. 1-1.

As shown in FIG. 7 to FIG. 10, in the order of No. 1-2, No. 1-3, No. 1-4, No. 1-5, the directivity improvement effect was increased and the directivity improvement effect of No. 1-5 was the highest. That is, in No. 1-1 not having the shield structure 50, the distortion of the directivity pattern is large and the directivity is disturbed. However, in the order of No. 1-2, No. 1-3, No. 1-4, No. 1-5, the distortion of the directivity pattern is decreased, and the directivity improvement effect is increased. Therefore, it is understood that: it is preferable that the shield structure 50 is present at least between a plurality of antenna elements; and it is most preferable that the shield structure 50 surrounds the entire periphery of each antenna element 11, 12, 13, 14.

Figure 11:
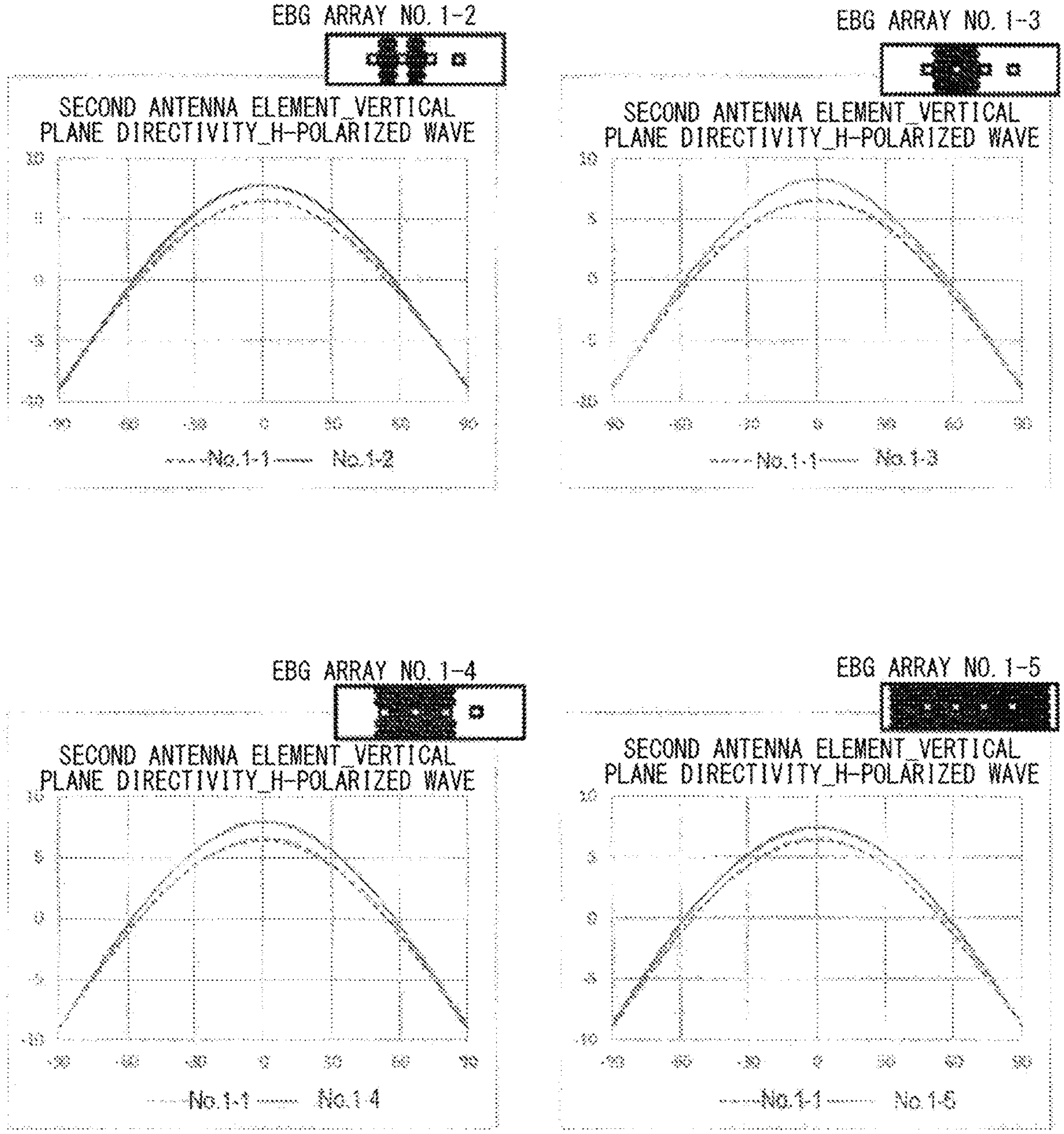
FIG. 11 is characteristic diagrams showing directivity of the second antenna element.
Figure 12:
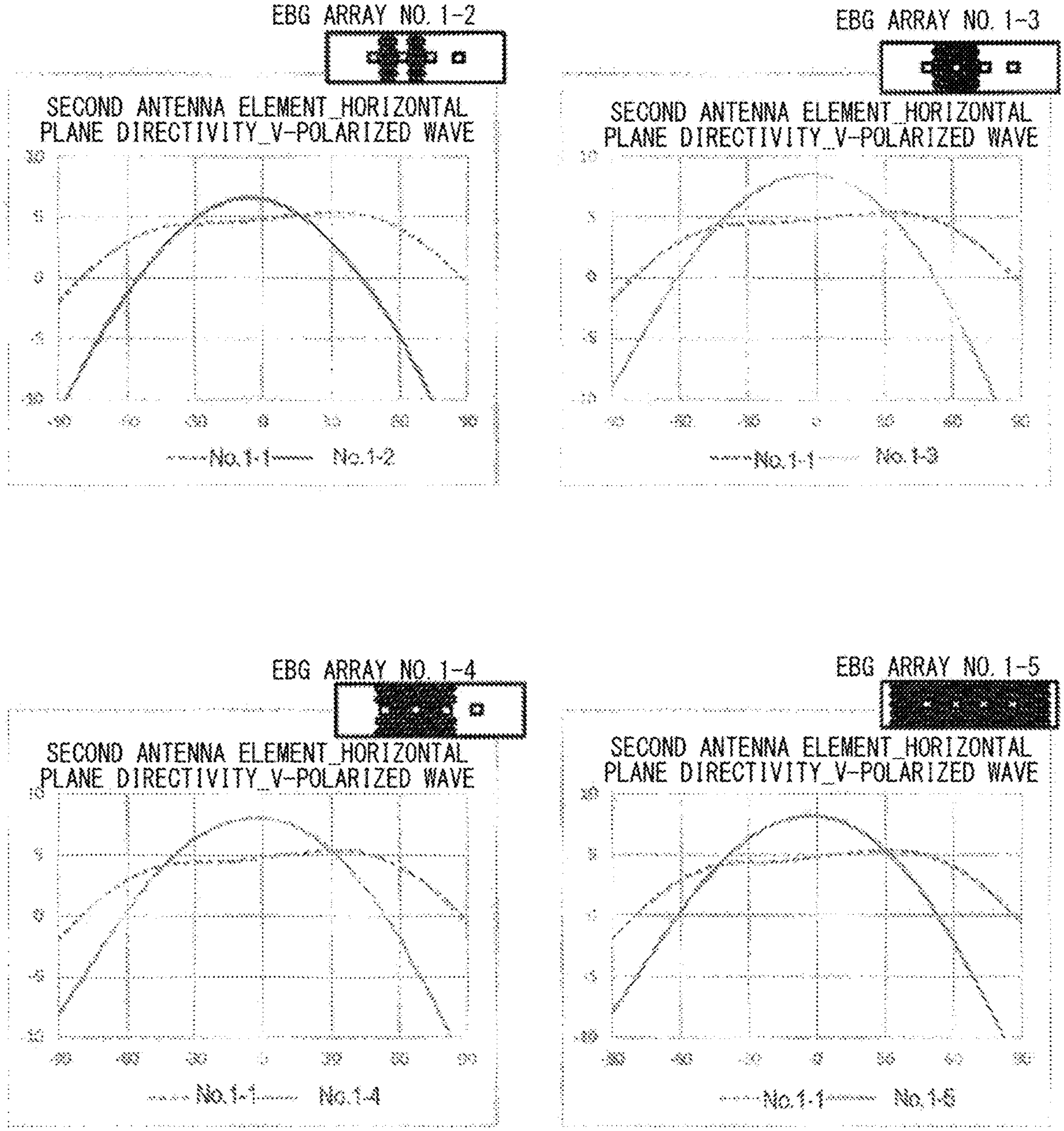
FIG. 12 is characteristic diagrams showing directivity of the second antenna element.
Figure 13:
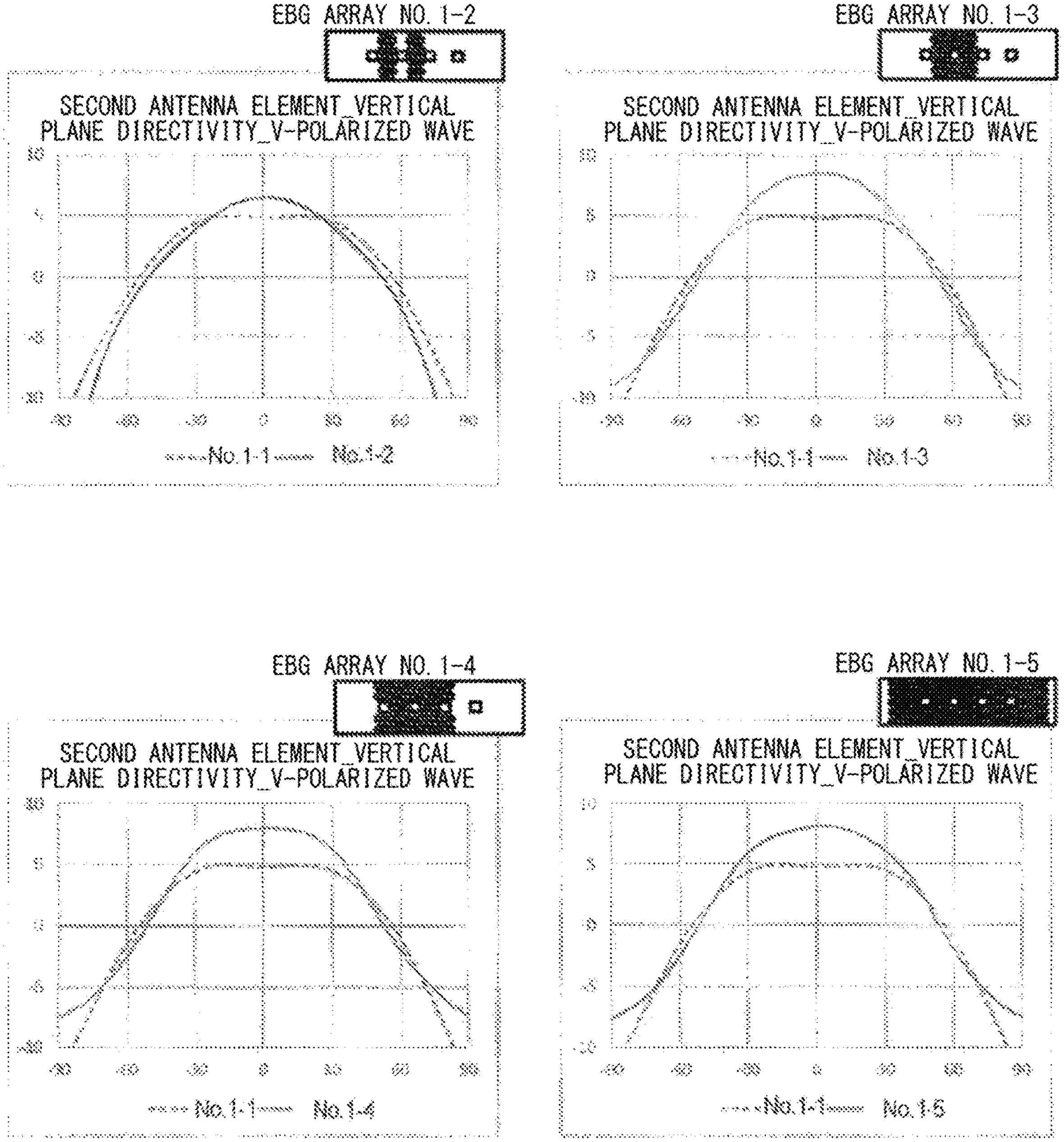
FIG. 13 is characteristic diagrams showing directivity of the second antenna element.

FIG. 11 shows the vertical plane directivity in the H-polarized wave of the second antenna element 12. FIG. 12 shows the horizontal plane directivity in the V-polarized wave of the second antenna element 12. FIG. 13 shows the vertical plane directivity in the V-polarized wave of the second antenna element. In each figure, a directivity improvement effect by the shield structure 50 is observed. It should be noted that the V-polarized wave is a vertically polarized wave, and the vertical direction is the Y-direction in FIG. 1. The vertical plane directivity is the directivity in a YZ-plane in FIG. 1.

FIG. 14 shows results of examination, performed on the second antenna element 12, as to inter-element sneaking (coupling between adjacent elements) at 28 GHz between the first antenna element 11 and the second antenna element 12, under the same conditions as those in the simulation shown in FIG. 5 to FIG. 13. FIG. 14 shows the maximum value of inter-element coupling at each of No. 1-1 to 1-5. Here, according to a reference that, for each value of the H-polarized wave and the V-polarized wave, coupling has been reduced if not greater than −18.3 dB is established, it is understood that coupling has been reduced in each of No. 1-2 to No. 1-5 having the shield structure 50. The reduction of coupling in No. 1-4 and No. 1-5 is especially large, which is preferable.

Figure 15:
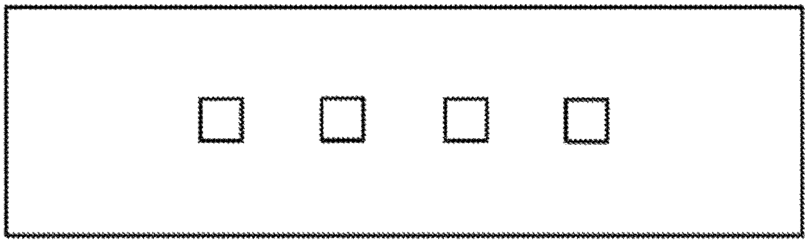
FIG. 15 is a schematic diagram showing EBG arrays.
Figure 15:
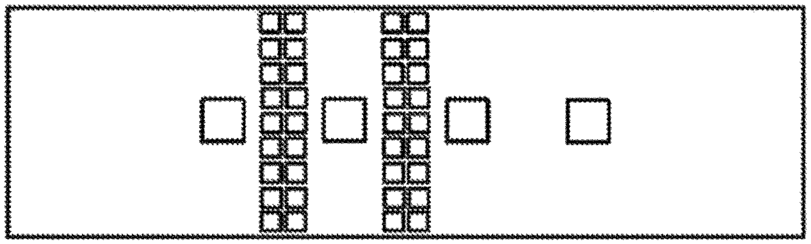
Figure 15:
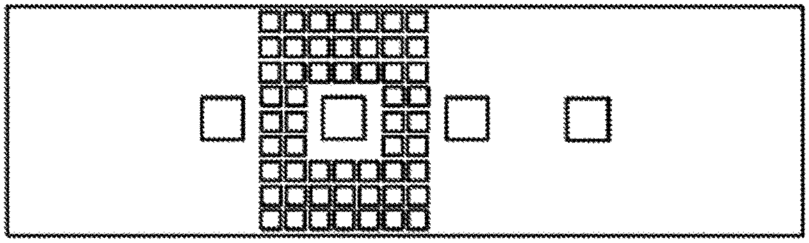
Figure 15:
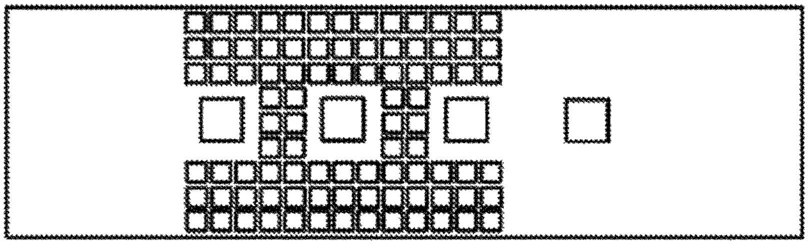
Figure 15:
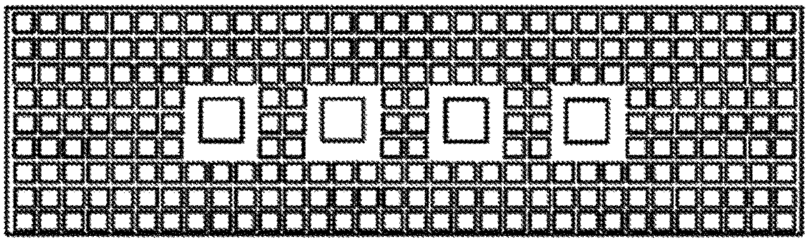

FIG. 15 to FIG. 23 show other simulation results of examination as to the directivity disturbance improvement effect by the shield structure 50. Here, the shape of the unit cell 51 of the shield structure 50 was set to be a square as shown in FIG. 15. Other than this, the simulation was performed in the same manner as in FIG. 5 to FIG. 13.

Figure 16:
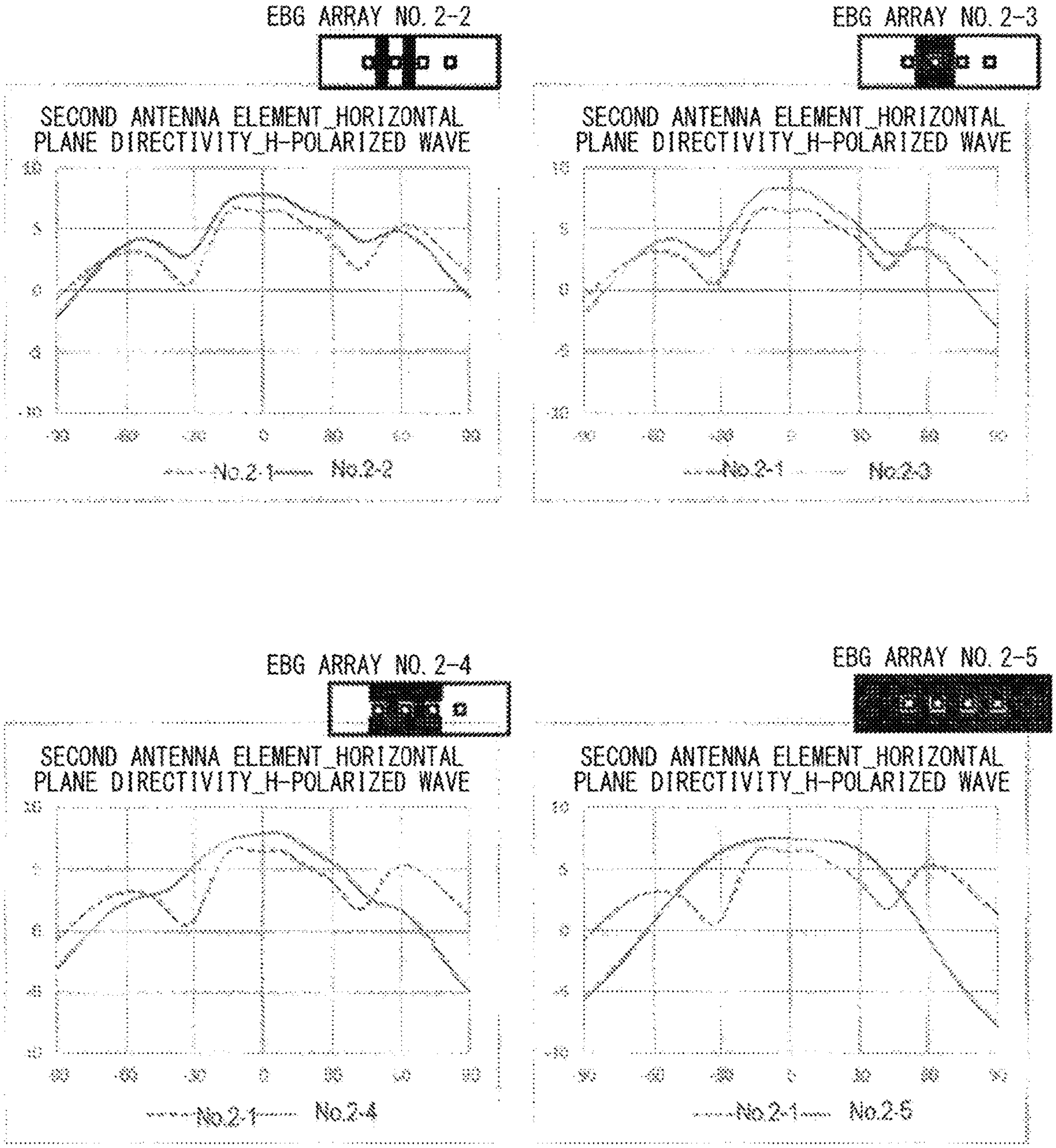
FIG. 16 is characteristic diagrams showing directivity of the second antenna element.

FIG. 16 shows the horizontal plane directivity in the H-polarized wave of the second antenna element 12 in No. 2-2 and No. 2-1.

As shown in FIG. 16, in the order of No. 2-2, No. 2-3, No. 2-4, No. 2-5, the directivity improvement effect was increased and the directivity improvement effect of No. 2-5 was the highest. That is, in No. 2-1 not having the shield structure 50, the ruggedness of the directivity pattern is large, and the directivity is disturbed. However, in the order of No. 2-2, No. 2-3, No. 2-4, No. 2-5, the ruggedness of the directivity pattern is decreased, and the directivity improvement effect is increased. Therefore, it is understood that: it is preferable that the shield structure 50 is present at least between a plurality of antenna elements; and it is most preferable that the shield structure 50 surrounds the entire periphery of each antenna element 11, 12, 13, 14. When the shield structure 50 surrounds the entire periphery of each antenna element 11, 12, 13, 14, the directivities of the respective antenna elements 11, 12, 13, 14 are more easily aligned, and the beam formed by the entirety of the array antenna 10 can be suppressed from becoming non-uniform depending on directions. When the case where the unit cell 51 has a square shape and the case where the unit cell 51 has a regular hexagon shape are compared with each other, the case of the regular hexagon enables a greater directivity improvement effect, which is preferable. That is, when unit cells 51 each having a square shape are densely arranged with the gap G therebetween, the longitudinal direction of the gap G extends in a linear shape, and thus, the suppression effect of propagation of the radio wave in the longitudinal direction of the gap G is reduced. In contrast to this, when unit cells 51 each having a regular hexagon shape are densely arranged with the gap G therebetween, the longitudinal direction of the gap G is bent, and thus, the suppression effect of propagation of the radio wave is enhanced. Therefore, the directivity of each antenna element 11, 12, 13, 14 is uniformized, whereby the directivity improvement effect is enhanced.

Figure 17:
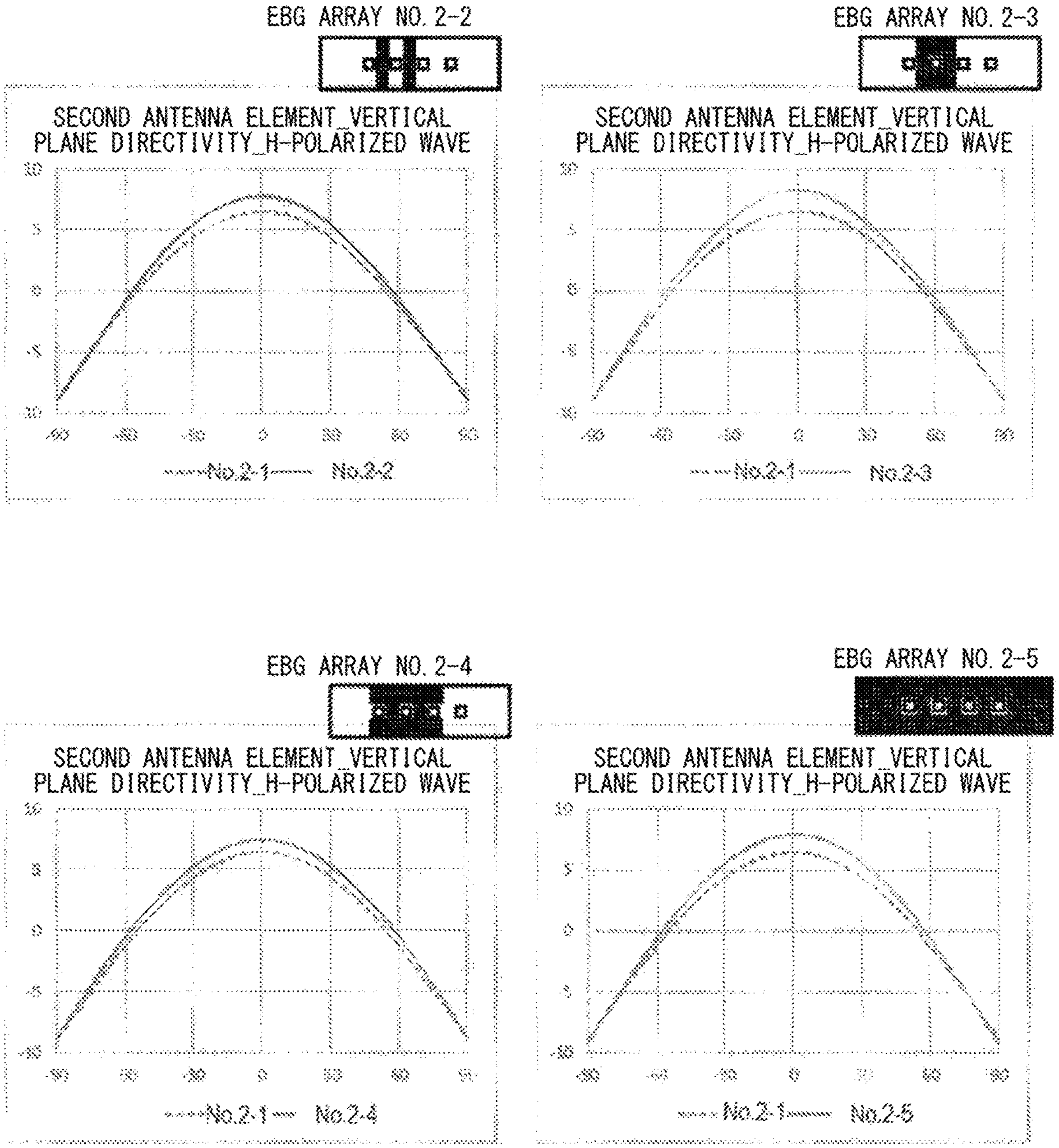
FIG. 17 is characteristic diagrams showing directivity of the second antenna element.
Figure 18:
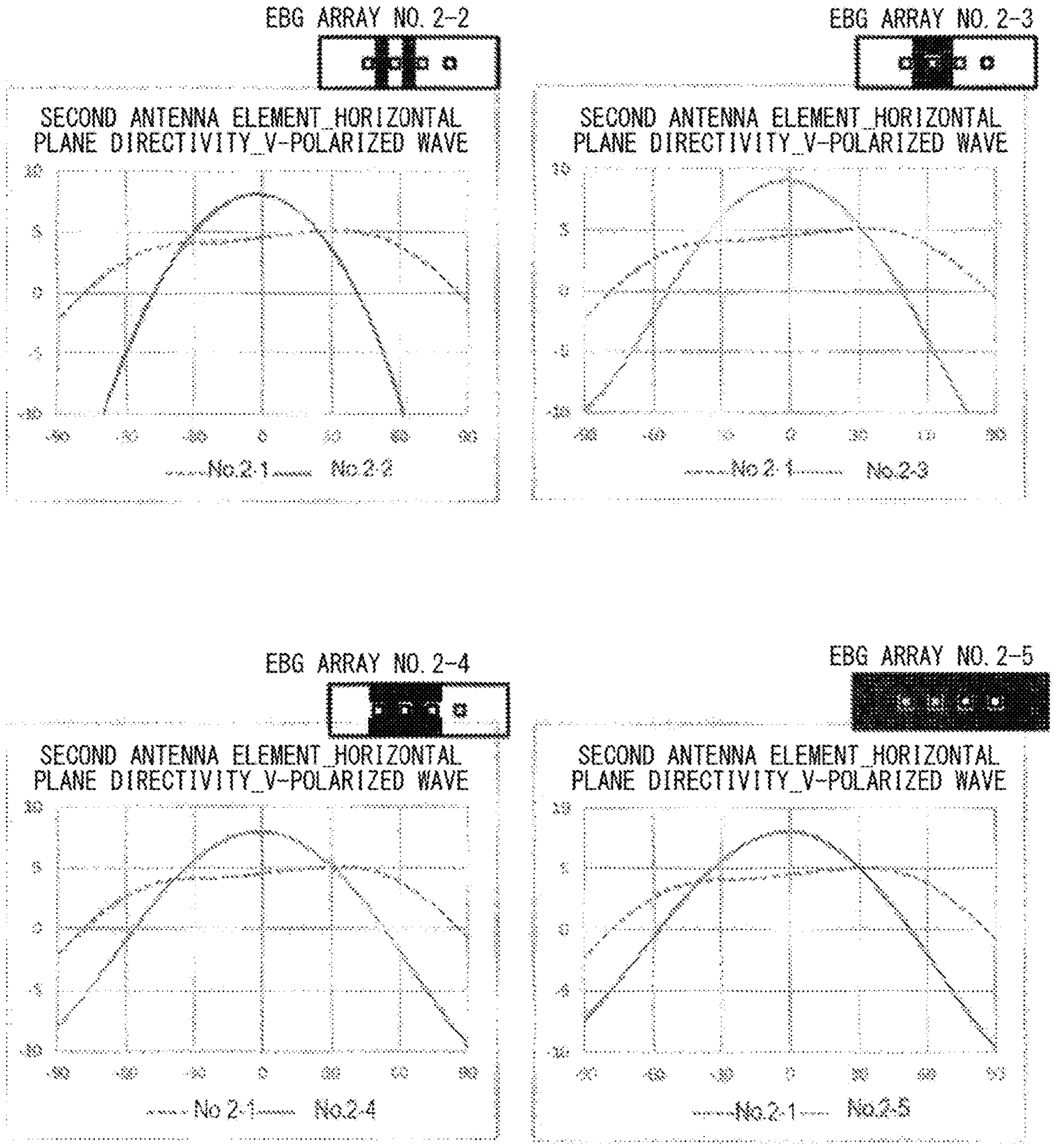
FIG. 18 is characteristic diagrams showing directivity of the second antenna element.
Figure 19:
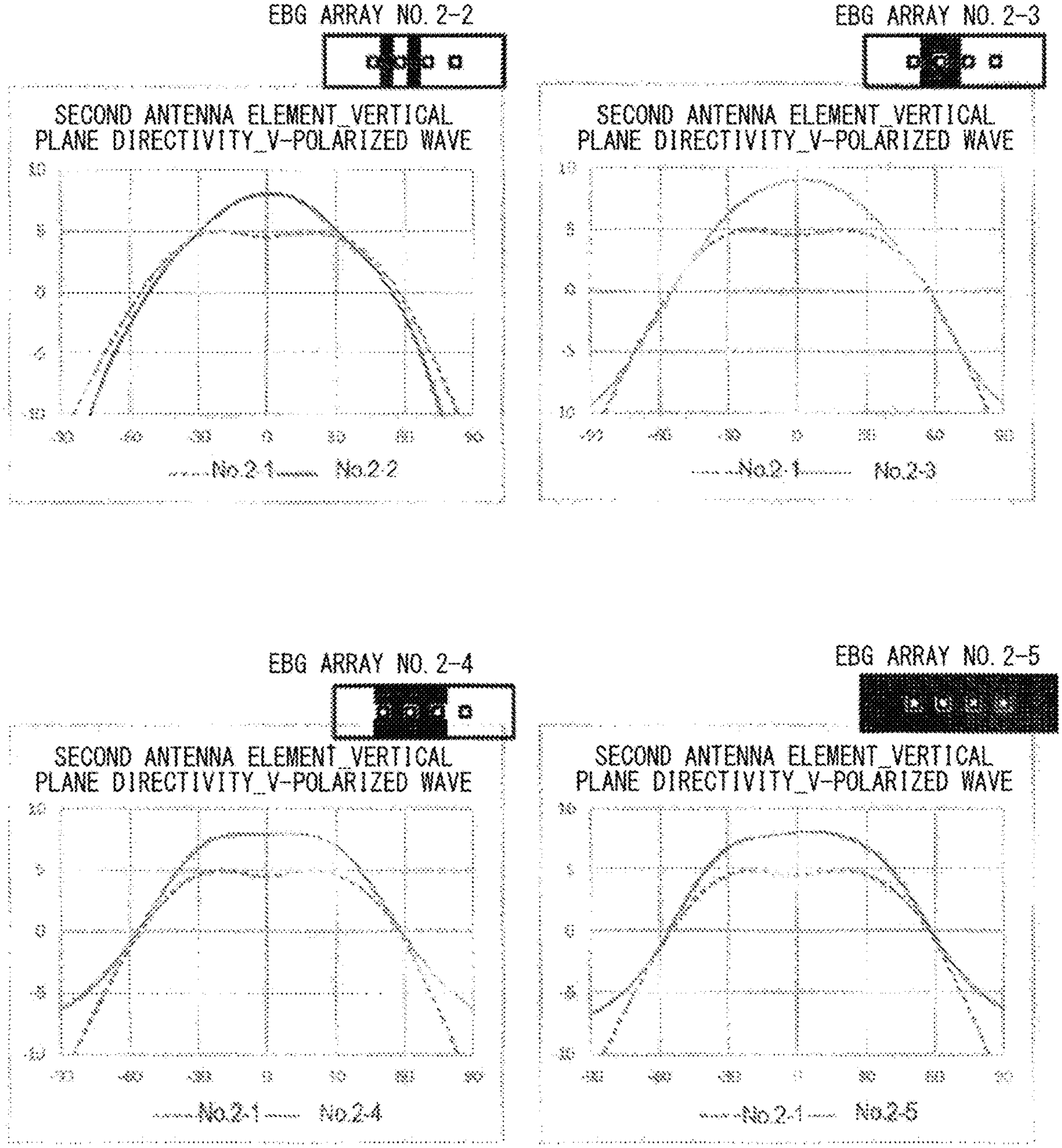
FIG. 19 is characteristic diagrams showing directivity of the second antenna element.
Figure 20:
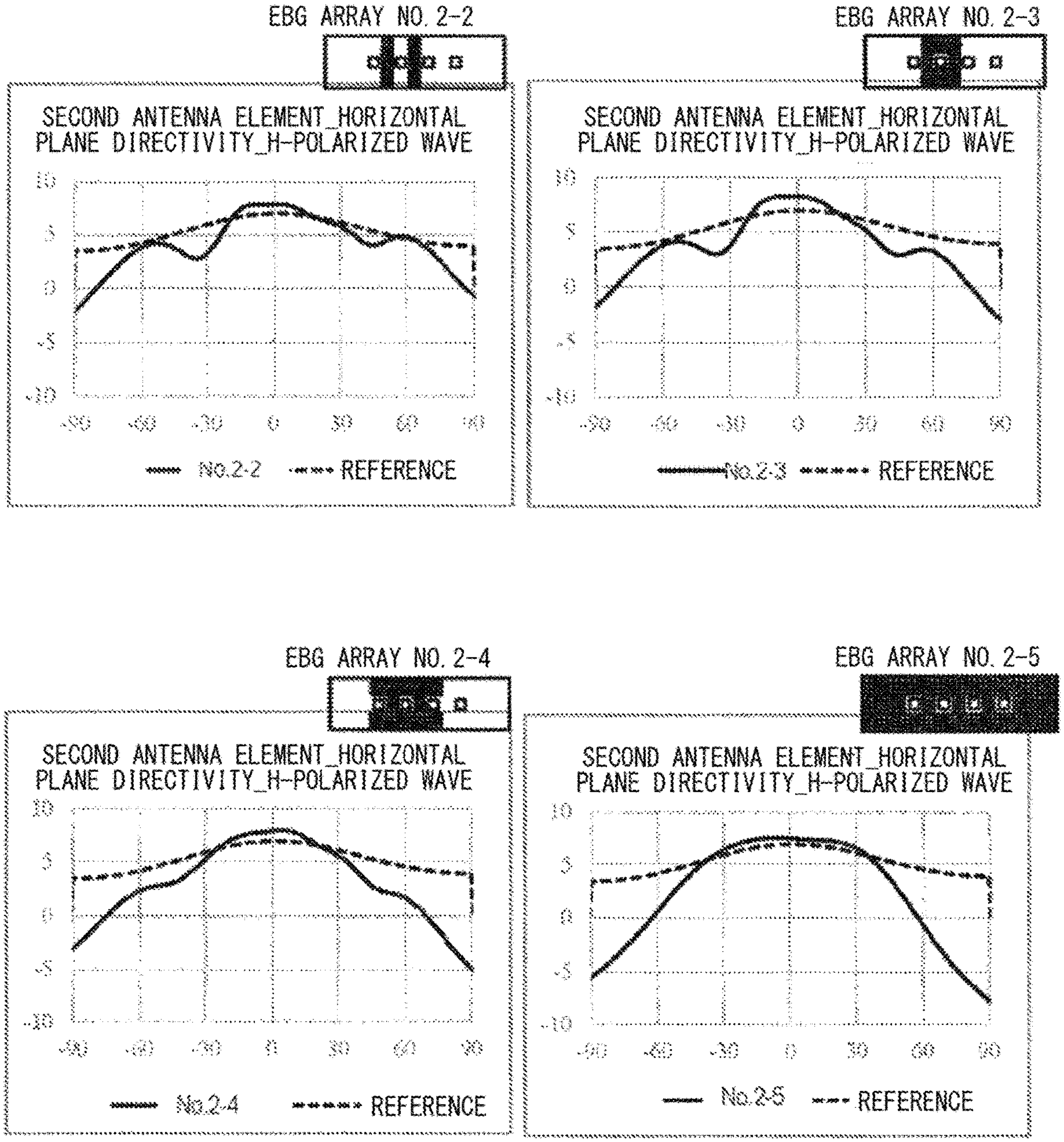
FIG. 20 is characteristic diagrams showing directivity of the second antenna element.
Figure 21:
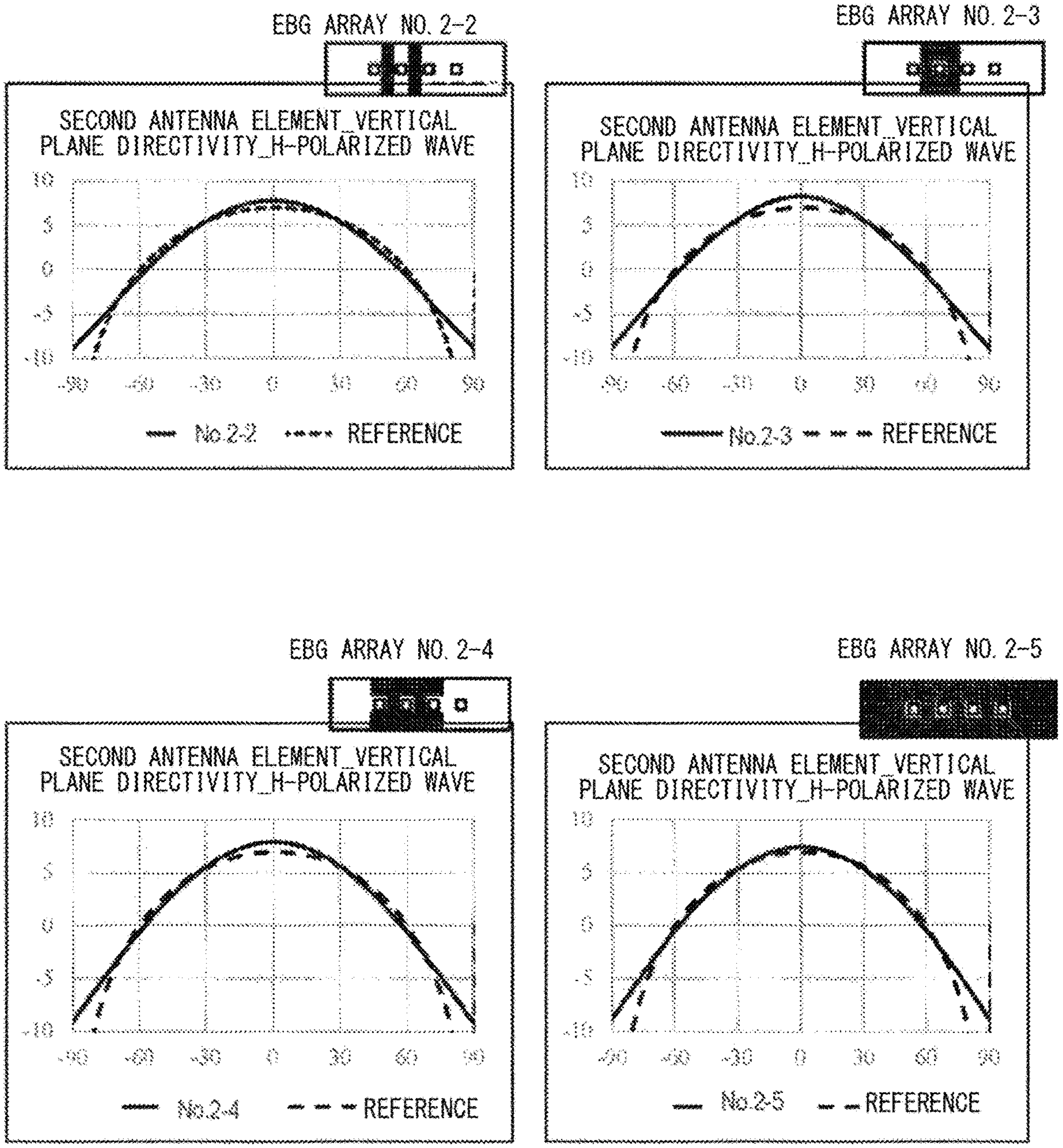
FIG. 21 is characteristic diagrams showing directivity of the second antenna element.
Figure 22:
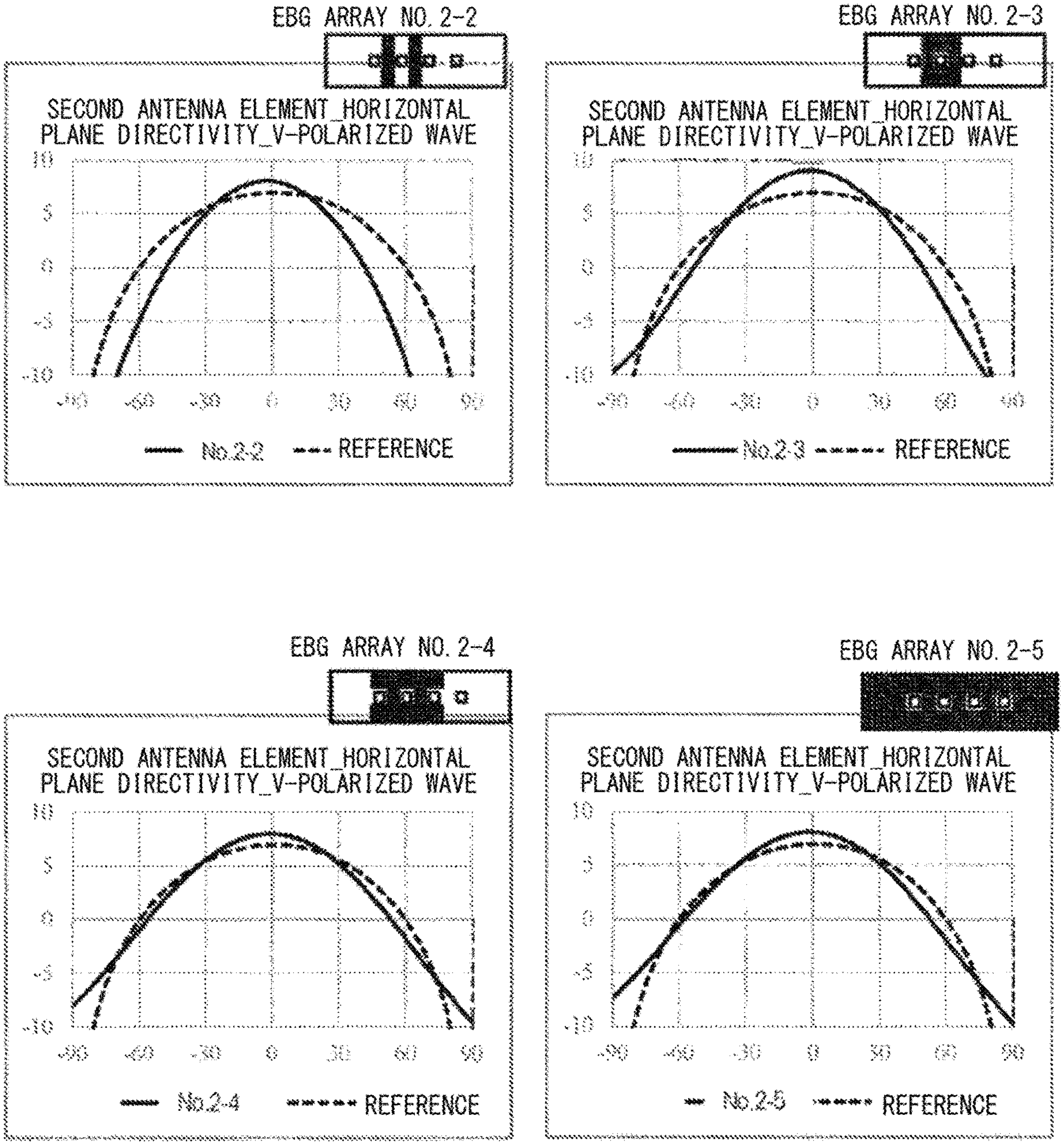
FIG. 22 is characteristic diagrams showing directivity of the second antenna element.
Figure 23:
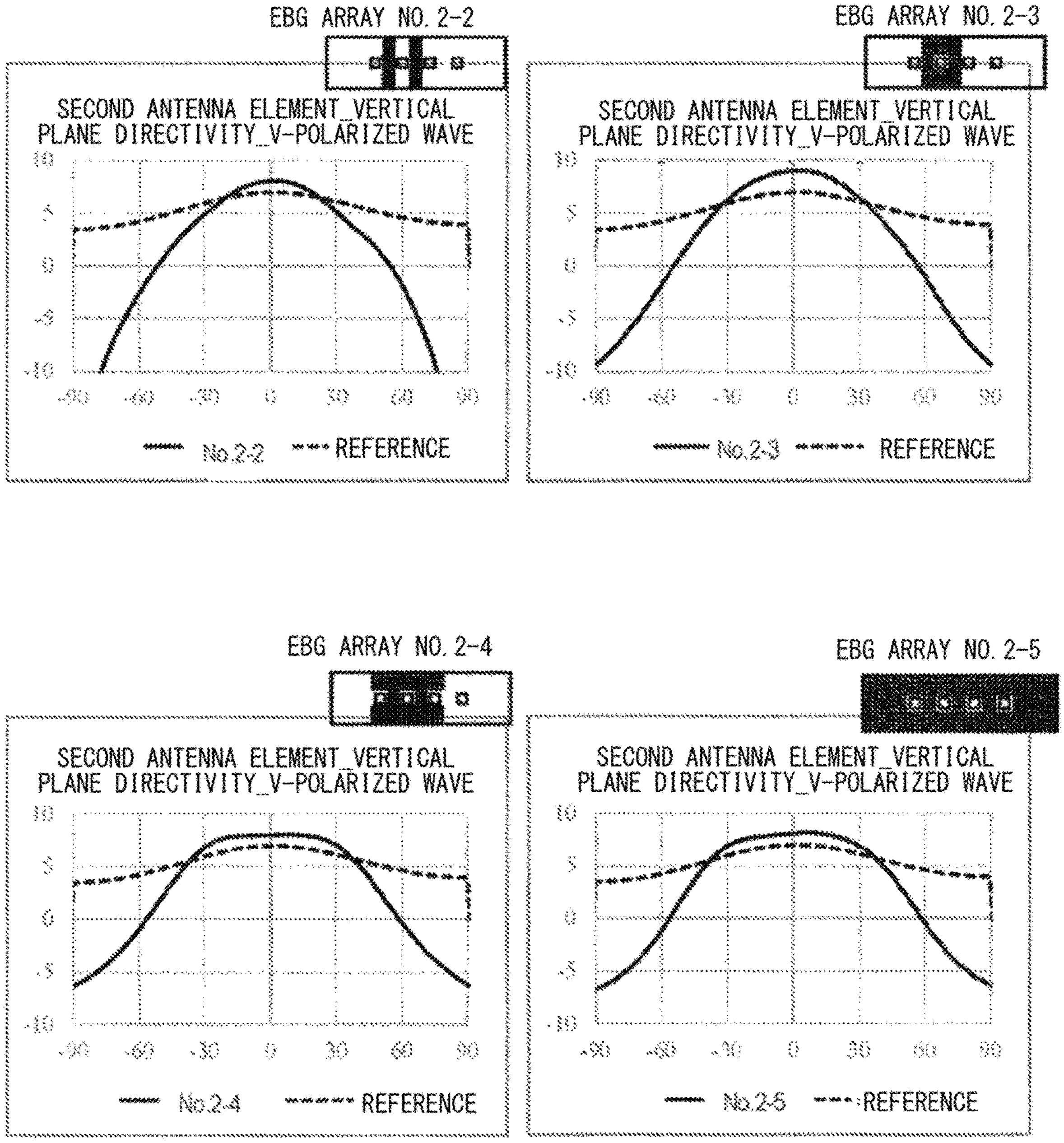
FIG. 23 is characteristic diagrams showing directivity of the second antenna element.

FIG. 17 shows the vertical plane directivity in the H-polarized wave of the second antenna element 12. FIG. 18 shows the horizontal plane directivity in the V-polarized wave of the second antenna element 12. FIG. 19 shows the vertical plane directivity in the V-polarized wave of the second antenna element. In each figure, a directivity improvement effect by the shield structure 50 is observed.

FIG. 20 to FIG. 23 show results of comparison between the directivities shown in FIG. 16 to FIG. 19 with a reference directivity. In FIG. 20 to FIG. 23, the reference directivity is indicated as "reference". The reference directivity here is an ideal directivity when a single second antenna element 12 is provided on the ground 20 on an infinite plane.

As shown in FIG. 20 to FIG. 23, when the shield structure 50 is provided, directivities close to the reference directivity are obtained. In particular, in No. 2-5, in a range of the vicinity (e.g., from −45° to +45°) in the front direction (0°), the directivity is closest to the reference directivity.

FIG. 24 shows results of examination, performed on the second antenna element 12, as to inter-element sneaking (coupling between adjacent elements) between the first antenna element 11 and the second antenna element 12, under the same conditions as those in the simulation shown in FIG. 15 to FIG. 23. FIG. 24 shows the maximum value of the inter-element coupling in each of Nos. 2-1 to 2-5. Here, according to a reference that, for each value of the H-polarized wave and the V-polarized wave, coupling has been reduced if not greater than −18.1 dB is established, it is understood that coupling has been reduced in No. 2-4 and No. 2-5.

Figure 25:
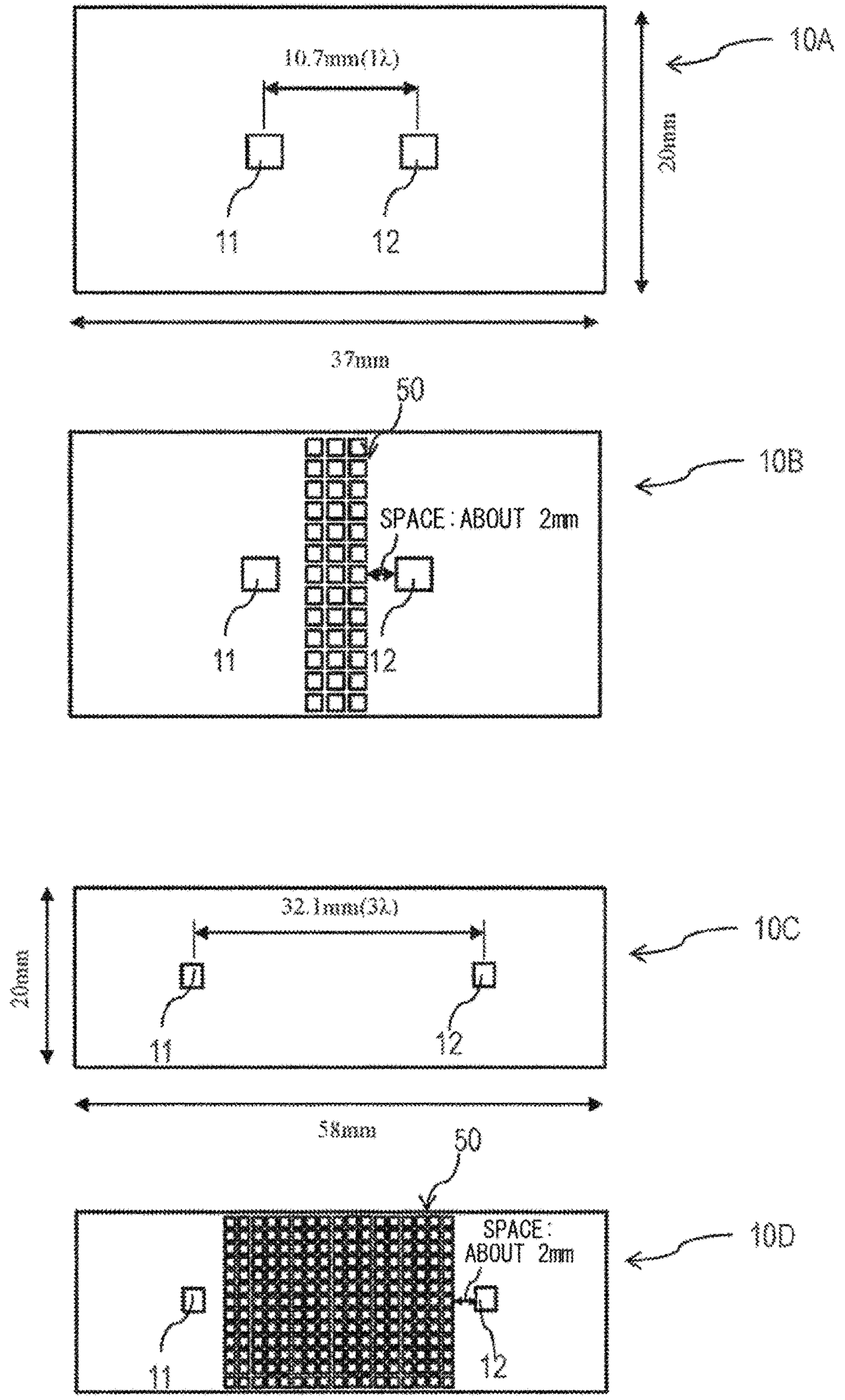
FIG. 25 is a schematic diagram showing EBG arrays.
Figure 26:
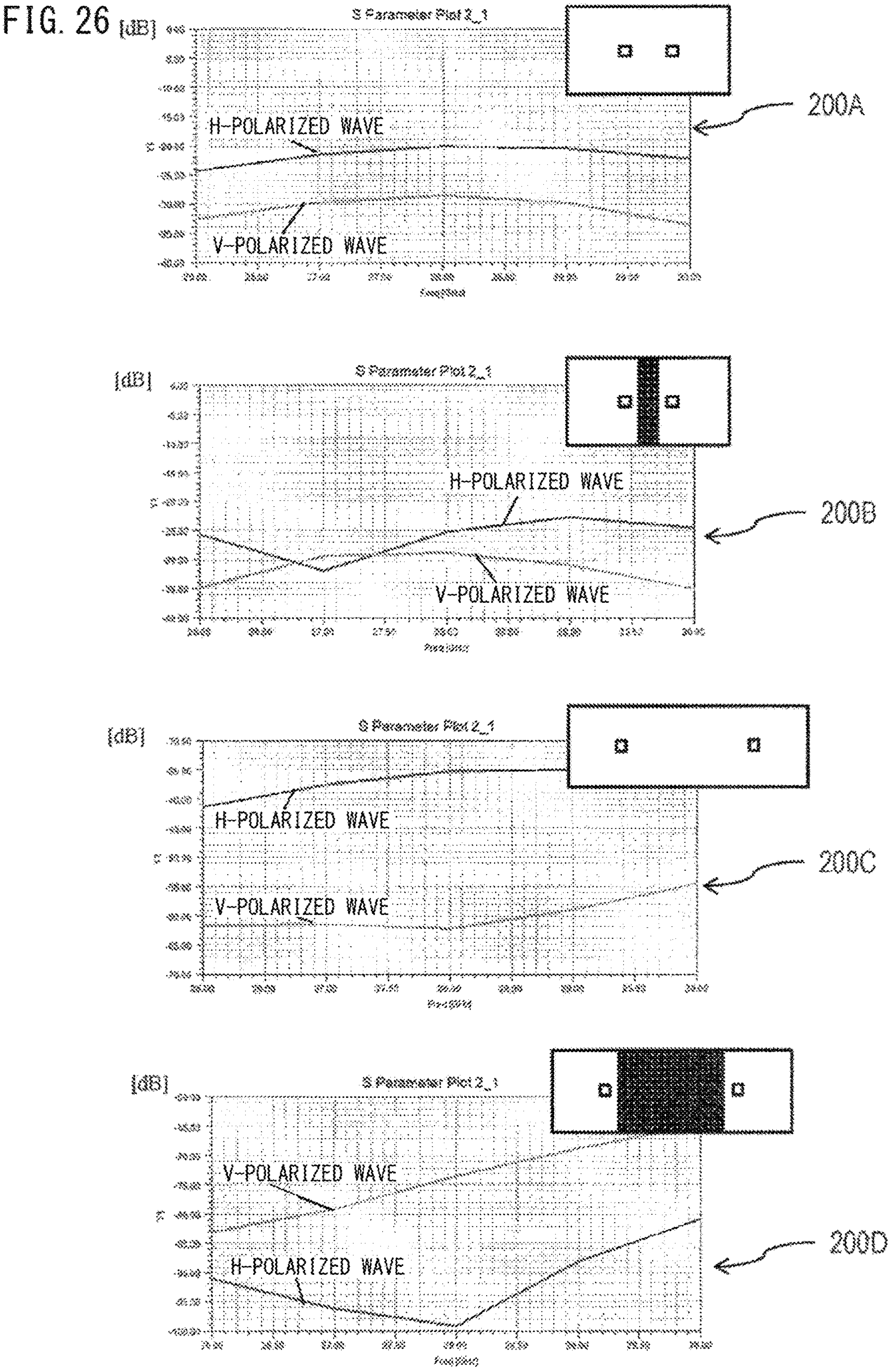
FIG. 26 is graphs showing sneaking between elements.

FIG. 25 and FIG. 26 show results of examination as to the magnitude of sneaking between two antenna elements 11, 12, with the element interval set to be different. In FIG. 25, an array antenna 10A has two antenna elements 11, 12, and the element interval is set to 10.7 mm (about 1λ). An array antenna 10B in FIG. 25 is obtained by providing the shield structure 50 having three rows of square unit cells, between the elements of the array antenna 10A. An array antenna 10C in FIG. 25 has two antenna elements 11, 12, and the element interval is set to 32.1 mm (about 3λ). An array antenna 10D in FIG. 25 is obtained by providing the shield structure 50 having 15 rows of square unit cells, between the elements of the array antenna 10C.

In FIG. 26, a graph 200A shows sneaking between adjacent elements with respect to the array antenna 10A, a graph 200B shows sneaking between adjacent elements with respect to the array antenna 10B, a graph 200C shows sneaking between adjacent elements with respect to the array antenna 10C, and a graph 200D shows sneaking between adjacent elements with respect to the array antenna 10D.

When the graph 200C and the graph 200D are compared with each other, in a case were the element interval is large (3λ), the sneaking suppression effect by the shield structure 50 is large. This is because, since a large number of unit cell rows can be arranged between the elements, the radio wave shielding effect is enhanced.

Meanwhile, when the graph 200A and the graph 200B are compared with each other, in a case where the element interval is small (1λ), the sneaking suppression effect by the shield structure 50 is small. This is because, since the number of unit cell rows that can be arranged between the elements is decreased, the radio wave shielding effect is reduced.

However, when ensuring characteristics of the entirety of the array antenna is taken into consideration, the element interval cannot be increased very much. The element interval is preferably not greater than 1.5λ, and more preferably about 1λ.

When the element interval is about 1λ, unit cell rows of only about three rows can be arranged between the elements as in Nos. 1-2, 2-2. However, when the shield structure 50 is formed as in Nos. 1-3, 1-4, 1-5 and Nos. 2-3, 2-4, 2-5, disturbance of the directivity can be prevented, which is advantageous.

The embodiment disclosed herein is merely illustrative in all aspects and should not be recognized as being restrictive. The scope of the present disclosure is defined not by the above embodiment but by the scope of the claims, and is intended to include meaning equivalent to the scope of the claims and all modifications within the scope.

REFERENCE SIGNS LIST

10 array antenna
11 first antenna element
12 second antenna element
13 third antenna element
14 fourth antenna element
20 ground
25 feeder line (microstrip line)
26 feeder line (via)
31 first dielectric layer
32 second dielectric layer
50 shield structure (EBG)
51 unit cell
52 via
G gap

The invention claimed is:

1. An array antenna comprising:

a plurality of antenna elements;

a ground having a reference potential;

a dielectric provided between the plurality of antenna elements and the ground, the dielectric having an electrical length, from the plurality of antenna elements to the ground, of not less than 0.03; and a shield structure provided at least between the plurality of antenna elements and configured to shield a radio wave radiated from each antenna element, wherein an interval between the plurality of antenna elements is not greater than 1.5λ(λ is a free-space wavelength of the radio wave), the plurality of antenna elements includes a first antenna element and a second antenna element arranged so as to be aligned in a first direction, the shield structure includes a first region, a second region, and a third region, the first region is provided between the first antenna element and the second antenna element, the second region is provided so as to extend from the first region toward a second direction orthogonal to the first direction, and the third region is provided from the second region so as to extend in parallel to the first direction and is positioned in a periphery of each of the first antenna element and the second antenna element.

2. The array antenna according to claim 1, wherein the shield structure is provided so as to surround an entire periphery of at least one antenna element included in the plurality of antenna elements.

3. The array antenna according to claim 1, wherein the shield structure is provided so as to surround an entire periphery of each of the plurality of antenna elements.

4. The array antenna according to claim 1, wherein the shield structure has a structure in which a plurality of unit cells are arrayed in a periodic manner.

5. The array antenna according to claim 4, wherein each unit cell is a hexagonal cell.

6. The array antenna according to claim 1, wherein the dielectric has a physical length, from the plurality of antenna elements to the ground, of not greater than 3 mm.

7. The array antenna according to claim 1, wherein the dielectric has a physical length, from the plurality of antenna elements to the ground, of not less than 0.01 mm.

8. The array antenna according to claim 1, wherein the radio wave has a frequency of not lower than 20 GHz.

* * * * *